(12) United States Patent
Yoshida

(10) Patent No.: US 9,376,145 B2
(45) Date of Patent: Jun. 28, 2016

(54) VEHICLE HOOD PANEL

(71) Applicant: Kobe Steel, Ltd., Kobe-shi (JP)

(72) Inventor: Masatoshi Yoshida, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 14/431,618

(22) PCT Filed: Oct. 1, 2012

(86) PCT No.: PCT/JP2012/075402
§ 371 (c)(1),
(2) Date: Mar. 26, 2015

(87) PCT Pub. No.: WO2014/054099
PCT Pub. Date: Apr. 10, 2014

(65) Prior Publication Data
US 2015/0353141 A1    Dec. 10, 2015

(51) Int. Cl.
*B62D 25/10* (2006.01)
*B60R 21/34* (2011.01)
*B62D 27/02* (2006.01)

(52) U.S. Cl.
CPC ............. *B62D 25/10* (2013.01); *B62D 25/105* (2013.01); *B62D 27/026* (2013.01); *B60R 2021/343* (2013.01)

(58) Field of Classification Search
CPC .. B60R 21/34; B60R 2012/343; B62D 25/10; B62D 25/105; B62D 25/12; B62D 27/026
USPC .......................... 296/187.04, 187.09, 193.11
See application file for complete search history.

(56) References Cited

U.S. PATENT DOCUMENTS

| 6,883,627 | B1 | 4/2005 | Staines et al. |
| 2004/0021342 | A1 | 2/2004 | Fujimoto |
| 2005/0082874 | A1 | 4/2005 | Ikeda et al. |
| 2006/0163915 | A1 | 7/2006 | Ikeda et al. |
| 2008/0007094 | A1 | 1/2008 | Ishitobi |

(Continued)

FOREIGN PATENT DOCUMENTS

| JP | 2001-151159 A | 6/2001 |
| JP | 2003 205866 | 7/2003 |

(Continued)

OTHER PUBLICATIONS

English translation of JP 2012-210909; retreived Nov. 19, 2015 from the Japan Platform for Patent Information located at https://www.j-platpat.inpit.go.jp/web/all/top/BTmTopEnglishPage.*

(Continued)

*Primary Examiner* — Jason S Daniels
(74) *Attorney, Agent, or Firm* — Oblon, McClelland, Maier & Neustadt, L.L.P.

(57) ABSTRACT

A vehicle hood panel has an outer panel and an inner panel joined to each other. The inner panel has a joining point surface joined to the outer panel by mastic. The inner panel has a plurality of beads surrounded by the joining point surface. Each bead is extended in a vehicle right-left direction. A bottom of the bead is communicated with the joining point surface by vertical walls. In at least one of front and vertical walls, an upper edge thereof is curved so that in plan view, a radius of curvature at a center portion in the vehicle right-left direction is smaller than a radius of curvature at each end in the vehicle right-left direction.

18 Claims, 28 Drawing Sheets

(56) References Cited

U.S. PATENT DOCUMENTS

| | | | |
|---|---|---|---|
| 2008/0272618 A1 | 11/2008 | Ikeda et al. | |
| 2010/0244494 A1 | 9/2010 | Yoshida et al. | |
| 2011/0169303 A1 | 7/2011 | Ikeda et al. | |

FOREIGN PATENT DOCUMENTS

| | | | |
|---|---|---|---|
| JP | 2004 217008 | | 8/2004 |
| JP | 2005 75163 | | 3/2005 |
| JP | 2005 75176 | | 3/2005 |
| JP | 2005 96512 | | 4/2005 |
| JP | 2005 96608 | | 4/2005 |
| JP | 2005 145224 | | 6/2005 |
| JP | 2005 239092 | | 9/2005 |
| JP | 3800601 | | 7/2006 |
| JP | 2006 273198 | | 10/2006 |
| JP | 2006 315555 | | 11/2006 |
| JP | 2007 69643 | | 3/2007 |
| JP | 2007 98963 | | 4/2007 |
| JP | 2007 185996 | | 7/2007 |
| JP | 3956833 | | 8/2007 |
| JP | 2008 24185 | | 2/2008 |
| JP | 2008 30574 | | 2/2008 |
| JP | 2008 68795 | | 3/2008 |
| JP | 2008 247394 | | 10/2008 |
| JP | 2008 296793 | | 12/2008 |
| JP | 2009 90935 | | 4/2009 |
| JP | 4292549 | | 7/2009 |
| JP | 4395597 | | 1/2010 |
| JP | 2010 116074 | | 5/2010 |
| JP | 4479844 | | 6/2010 |
| JP | 2012 501912 | | 1/2012 |
| JP | 2012210909 A | * | 11/2012 |
| WO | 2010 029251 | | 3/2010 |
| WO | 2012 073870 | | 6/2012 |

OTHER PUBLICATIONS

International Search Report Issued Nov. 13, 2012 in PCT/JP2012/075402 Filed Oct. 1, 2012.

International Preliminary Report on Patentability and Written Opinion issued Apr. 16, 2015 in PCT/JP2012/075402 (with English Translation).

* cited by examiner

Fig. 21(a)
Fig. 21(b)
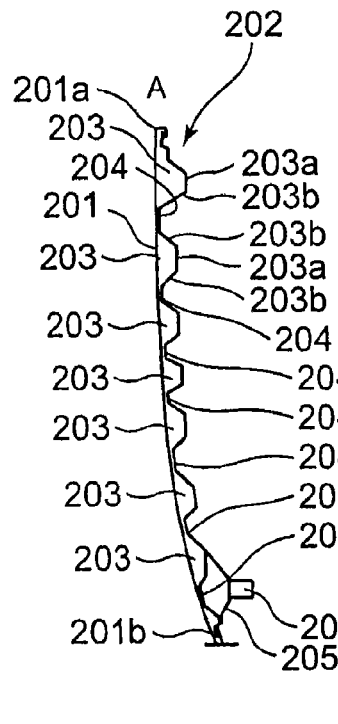
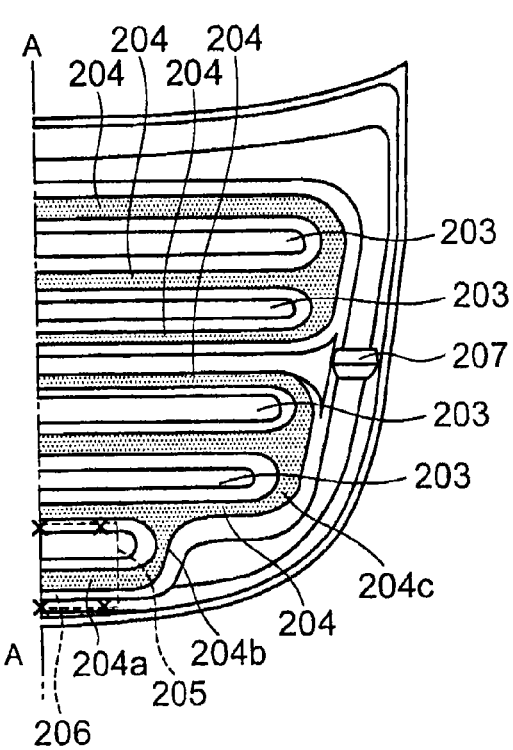
Fig. 22(a)
Fig. 22(b)
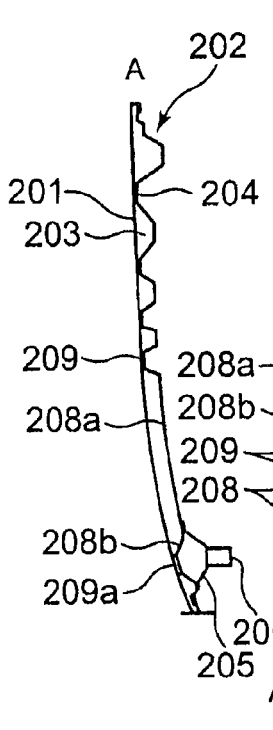
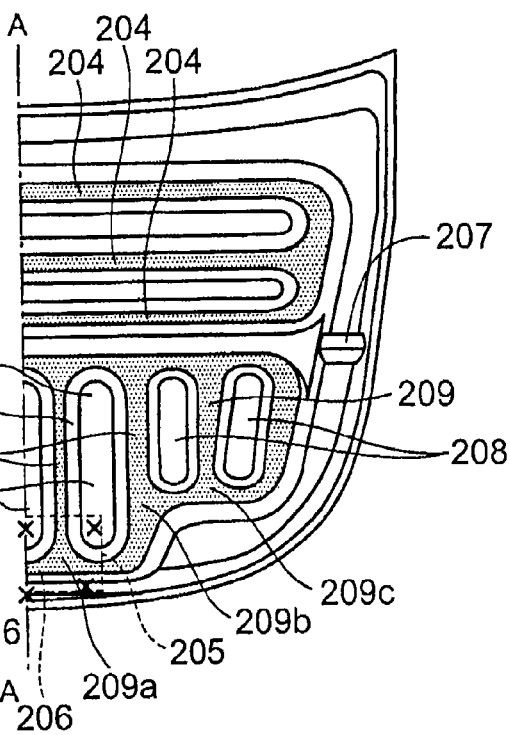

Fig.25(a) Fig.25(b)
Fig.26(a) Fig.26(b)
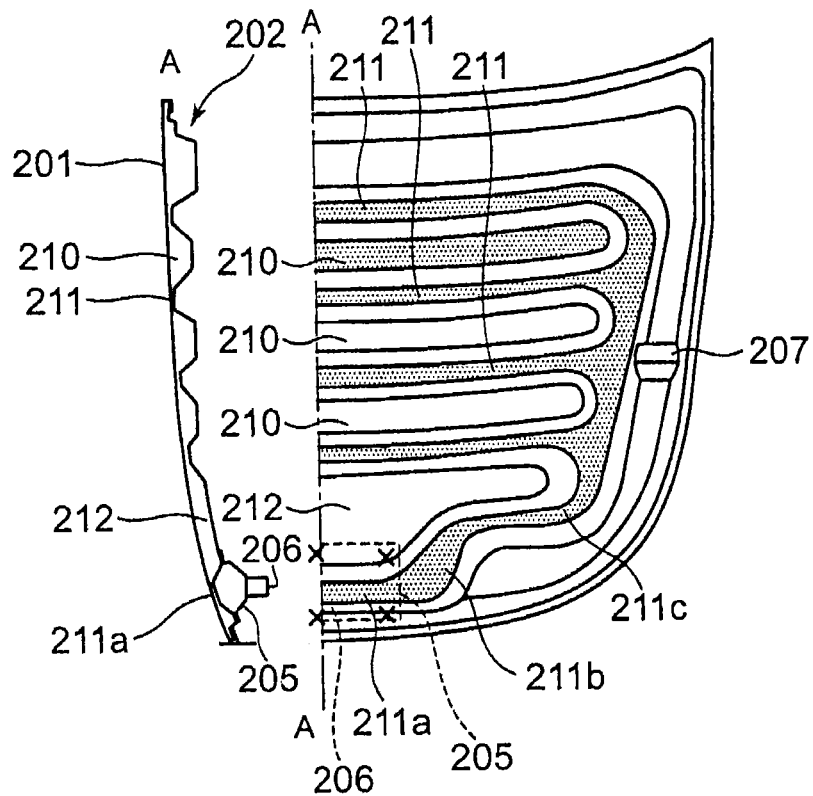
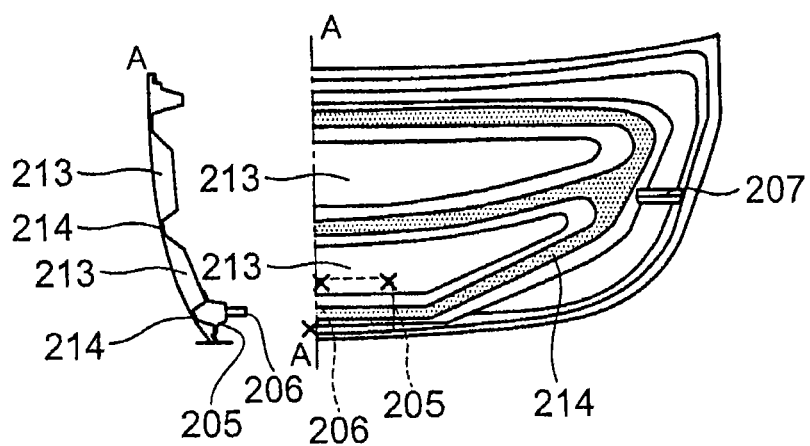

VEHICLE HOOD PANEL

CROSS-REFERENCE TO RELATED APPLICATIONS

This is a national phase application in the United States of International Patent Application No. PCT/JP2012/075402 with an international filing date of Oct. 1, 2012 the contents of which are incorporated herein by reference.

TECHNICAL FIELD

The present invention relates to a vehicle hood panel. More specifically, the present invention relates to a vehicle hood panel excellent in the pedestrian protection performance at collision and the front collision performance of vehicles. In addition, the present invention relates to a vehicle hood panel excellent in the pedestrian head collision performance and ensuring the dent resistance immediately above a striker at low cost.

BACKGROUND ART

A first conventional technique will be described. Conventionally, in an automobile having a hood in the front portion thereof, a vehicle hood panel has an outer panel, an inner panel, and other reinforcing members. To highly ensure the rigidity and strength of the vehicle hood panel, the outer panel is joined to the inner panel with a space therebetween.

In the conventional vehicle hood panel, various techniques are proposed to improve the pedestrian protection performance at pedestrian collision while highly ensuring the mechanical performance, such as rigidity.

For instance, JP 2003-205866 A proposes a structure in which a plurality of hat-shaped beads are formed in parallel near the center of the inner panel, thereby ensuring the dent resistance and the stiffness required for the vehicle hood and improving the pedestrian protection performance at pedestrian collision.

To evaluate the pedestrian protection performance, an HIC value calculated by the time waveform of the acceleration at collision is typically used. As the HIC value is lower, the head of a pedestrian is less likely to be injured at collision. Therefore, as described above, a hood structure which lowers the HIC value while ensuring the dent resistance and the stiffness is desired.

In a typical acceleration waveform when a head collides with the vicinity of the center of the hood panel, a first wave occurs when the head comes into contact with the hood panel in the initial stage of collision, and then, a second wave occurs when the hood panel pressed by the head is moved in the vehicle downward direction and comes into contact with the incorporated components, such as an engine, disposed below the panel.

To reduce the HIC value, in particular, it is effective to make the second wave of acceleration smaller. For this, at head collision, it is necessary to absorb the collision energy before the hood panel comes into contact with the incorporated components. It is desirable to sufficiently ensure the gap between the hood panel and the incorporated components.

However, when considering that the components necessary for the automobile are disposed below the hood in the limited space, it is often difficult to sufficiently ensure the gap between the hood panel and the incorporated components.

Therefore, desired is a hood structure in which the first wave of acceleration at head collision is increased to a maximum extent to increase the amount of energy absorption in the initial stage of collision, so that the deformation stroke is reduced or the second wave of acceleration when the hood comes into contact with the incorporated components is made smaller.

As disclosed in JP 2003-205866 A, the beads are formed in parallel in the inner panel. Therefore, the bending rigidity of the inner panel can be improved, the bending deformation of the inner panel at pedestrian head collision can be restrained, and the impact load can be widely distributed in the panel. With this, the area in which the panel is displaced at pedestrian head collision, that is, the inertia weight, is increased. As compared with the inner panel not having the beads, the first wave of acceleration at head collision can thus be larger. In addition, since the hat-shaped beads are easily spread-deformed at contact with the incorporated components, the second wave of acceleration can be smaller.

Therefore, other than, various techniques for providing the beads in the inner panel are proposed. For instance, in JP 2005-96512 A, JP 2008-24185 A, JP 2004-217008 A, and JP 2005-96608 A, the hat-shaped beads are extended in the vehicle front-rear direction. In JP 2005-96512 A, the vertical walls of the beads have a stepped shape. In JP 2008-24185 A, the depth of the bottoms of the beads is changed. In JP 2004-217008 A, a notch is provided between the beads. In addition, in many cases, a child pedestrian collides with the front of the hood panel, and an adult pedestrian collides with the rear of the hood panel. Therefore, JP 2005-96608 A, the hat-shaped beads in the inner panel have different shapes between the front and rear of the vehicle.

In JP 2006-315555 A, the beads are inclined with respect to the vehicle front-rear direction so that the distance between the beads becomes greater toward the vehicle rear side.

The vehicle hood panel has many design requirements to be satisfied, other than the pedestrian protection performance. For instance, at front collision of vehicles, the hood panel is required to be bending-deformed in doglegged shape in side view for absorbing the impact, thereby restraining the panel from entering into the vehicle. In JP 2005-75163 A and JP 2005-239092 A, the beads extended in the vehicle front-rear direction are connected by a different bead (called a crush bead) extended in the vehicle right-left direction, or the adjacent beads are connected by a flange. The hood panel is thus easily bending-deformed at front collision.

In JP 2005-145224 A, JP 2006-273198 A, JP 2009-90935 A, JP 2008-30574 A, and JP 2010-116074 A, the hat-shaped beads are extended in the vehicle right-left direction. The hood panel is thus easily bending-deformed at front collision.

A second conventional technique will be described. In a vehicle, such as an automobile, having a hood in the front portion of the body thereof, the hood has an outer panel, an inner panel disposed on the lower surface side of the outer panel, and a reinforcing member disposed between the outer panel and the inner panel. To ensure the rigidity and strength of the hood itself, the outer panel is joined to the inner panel to take a closed cross-sectional structure with a space therebetween, a plurality of reinforcing members being provided therein.

In recent years, in addition to ensuring of the hood rigidity, dent resistance, and stiffness, the hood panel has been required to reduce the injury value at pedestrian head collision. To evaluate the pedestrian protection performance, the HIC value calculated by the time waveform of the acceleration at collision is typically used. As the HIC value is lower, the head of a pedestrian is less likely to be injured. That is, desired is a hood structure which lowers the HIC value while ensuring the necessary hood strength requirements. In addition, to ensure the degree of freedom of the layout of various function components, such as an engine, disposed below the hood, desired is a hood structure which can reduce the gap between these components and the lower surface of the hood.

In the acceleration waveform at head collision with the hood, typically, a first wave occurs when the head comes into contact with the outer panel of the hood, and then, a second wave of acceleration occurs due to contact with the components disposed below the hood. To reduce the HIC value, it is most effective to make the second wave of acceleration smaller. It is ideal to sufficiently ensure the gap between the bottom surface of the hood and the components disposed therebelow. However, as described above, when considering the desire to reduce the gap, it is also necessary to increase the first wave of acceleration to reduce the energy absorption stroke itself.

To ensure the rigidity of the inner panel itself, a concave portion is provided in substantially annular shape in the outer periphery of the inner panel of the hood. In recent years, the pedestrian protection requirements have been stricter. Even when the head of a pedestrian collides with the vicinity of the concave portion in the inner panel, which is the outer periphery of the hood, it is necessary to ensure the predetermined pedestrian protection performance.

In particular, the required performance for the dent resistance immediately above the lock is stricter on the front side than in other portions of the hood. Typically, the dent reinforcing member is provided near the lock in the concave portion in the inner panel on the hood front side so as to be close to the outer panel, thereby ensuring the stiffness and dent resistance of the outer panel and improving the pedestrian protection performance (JP 4292549 B2 and JP 2007-98963 A).

In the above structure, the dent reinforcing member is joined to the outer panel by mastic. The interval between the support points on the outer panel is shortened, so that deformation of the outer panel alone is restrained. The dent resistance and stiffness can be reduced, and lowering of the first wave of acceleration due to the deformation resistance reduction at head collision can be restrained. In many cases, these structures have the lock reinforcing member to which the striker is joined in the lower surface side of the inner panel, thereby ensuring the strength and rigidity of the lock.

However, since the above structure uses two reinforcing members, the number of components is increased to make the cost higher.

Accordingly, to reduce the number of components, proposed is a structure in which the lock reinforcing member on the lower surface side of the hood is extended upwardly of the vehicle to eliminate the dent reinforcing member and the lock reinforcing member is joined to the outer panel by mastic, thereby ensuring the dent resistance ( JP 2007-185996 A, JP 2008-296793 A, JP 3956833 B2).

However, the lock reinforcing member is required to ensure the strength and rigidity of the lock, and to have a larger plate thickness than the inner panel and the dent reinforcing member. At pedestrian head collision, the leg connecting the joining surface to the outer panel and the lower surface of the inner panel to which the striker is joined is difficult to be bent. The acceleration at head collision is increased to deteriorate the head injury value (HIC value).

Therefore, to ensure the strength and rigidity of the lock and to improve the pedestrian protection performance, proposed is a structure in which a thin wall member is used for the stiffener on the vehicle rear side with which the head of a pedestrian collides, and a thick wall member is used for the portion of the inner panel to which the striker is joined and the striker supporting portion (JP 2007-69643 A, JP 2008-68795 A, and JP 4479844 B2).

However, in such a structure, the number of components is increased to make the cost higher.

Therefore, used partly is a structure in which the lock reinforcing member is joined to the portion of the inner panel on the vehicle lower side, the inner panel thinner than the lock reinforcing member is disposed on the striker, and the inner panel is joined to the outer panel by mastic, thereby ensuring the dent resistance and pedestrian protection performance (JP 3800601 B2, JP 2005-75176 A, JP 2008-247394 A, and JP 4395597 B2).

FIG. 31 is a bottom view showing a conventional vehicle hood. An outer panel 201 is overlapped with and fixed to an inner panel 202. Beads 231 are formed in the inner panel 202 to be extended in the vehicle width direction. Between the beads 231, a joining point surface 232 as the joining surface to the outer panel 201 is provided. A lock reinforcing member 205 supporting a striker 206 is joined and fixed to the lower surface of the inner panel 202 at the vehicle front end.

SUMMARY OF THE INVENTION

Problems to be Solved by the Invention

However, the first conventional technique has the following problem. That is, as disclosed in JP 2003-205866 A, JP 2005-96512 A, JP 2008-24185 A, JP 2004-217008 A, JP 2005-96608 A, JP 2006-315555 A, JP 2005-75163 A, and JP 2005-239092 A, when the beads are extended in the vehicle front-rear direction, the deformation rigidity of the beads with respect to the impact load at front collision is high, so that the beads are difficult to be bending-deformed. To improve the problem, for instance, the height of the crush bead is increased to promote the bending deformation at front collision. However, when the height of the crush bead is increased, the hood panel is easily bending-deformed from the crush bead at pedestrian head collision. That is, after the peak of the first wave of acceleration due to head collision, the acceleration is suddenly lowered, the amount of energy absorption in the initial stage of collision is reduced, and the energy absorption stroke is increased to make the HIC value higher (the pedestrian protection performance is lowered).

To solve the problem at front collision, like the techniques of JP 2005-145224 A, JP 2006-273198 A, JP 2009-90935 A, JP 2008-30574A, and JP 2010-116074 A, the beads should be extended in the vehicle right-left direction. However, in the inner panel of JP 2005-145224 A, the beads are extended in the vehicle right-left direction. Therefore, as in the case that the crush bead or the flange is provided between the beads extended in the vehicle front-rear direction, at pedestrian head collision, the hood panel is easily bending-deformed in doglegged shape in side view. After the peak of the first wave of acceleration due to head collision, the acceleration is suddenly lowered, so that the amount of energy absorption of the panel is decreased to make the HIC value higher.

To restrain the hood panel from being bending-deformed at pedestrian collision, in JP 2006-273198 A, in order that the beads are not easily spread-deformed in the vehicle front-rear direction, shape freezing beads for restraining spreading deformation are provided at the upper ends of the beads on the inner panel side. To restrain the beads from being spread-deformed at pedestrian collision, as disclosed in JP 2009-90935 A, the joining surface of the upper edge of each bead to the outer panel is connected by the curved surface. However, in JP 2006-273198 A and JP 2009-90935 A, the beads in the inner panel are formed in uniform shape in the vehicle width direction or in the vehicle front-rear direction. It is not taken into account that the pedestrian protection performance at head collision is non-uniform in the vehicle width direction.

To restrain the hood panel from being bending-deformed at pedestrian collision, in JP 2008-30574 A and JP 2010-116074 A, the joining surface to the outer panel is provided at the center of the inner panel to form the beads extended in the vehicle right-left direction inside the surface.

FIGS. 28(a) to 28(c) are diagrams showing the conventional vehicle hood panel disclosed in JP 2008-30574 A and JP 2010-116074 A. To facilitate the understanding of the structure of the inner panel, the outer panel is indicated by an alternate long and two short dashes line. As shown in FIGS. 28(a) to 28(c), a conventional vehicle hood panel 10 has an inner panel 11, and an outer panel 12. For instance, the outer edge of the inner panel 11 is joined to the outer edge of the outer panel 12 by hemming. As shown in FIG. 28(a), at the center of the inner panel 11, a joining point surface 11a joined to the outer panel 12 by mastic is formed, a vertical wall 14 surrounding the periphery thereof. As shown in FIGS. 28(b) and 28(c), a mastic adhesive 13 made of e.g., an epoxy resin or a modified silicone resin is coated between the joining point surface 11a and the outer panel 12 to join the joining point surface 11a and the outer panel 12. In addition, the inner panel 11 has a plurality of beads 11b of concave cross section extended downwardly from the edges of the joining point surface 11a and extended in parallel in the vehicle right-left direction to be surrounded by the joining point surface 11a. That is, around each bead 11b, vertical walls 11c and 11d are provided, and the bottom of the bead 11b is communicated with the joining point surface 11a by the vertical walls 11c on the vehicle front and rear sides and the side vertical wall 11d at each end in the vehicle right-left direction. In the conventional vehicle hood panel 10, both the vertical walls 11c communicating the bottom of the bead 11b with the edges of the joining point surface 11a on the vehicle front and rear sides are planar, and in plan view, are straight to be extended in the vehicle right-left direction. The side vertical wall 11d which communicates the bottom of the bead 11b with each edge of the joining point surface in the vehicle right-left direction has e.g., a curved surface which connects the vertical walls 11c on the vehicle front and rear sides. As shown in FIGS. 30(b) and 30(c), in the conventional vehicle hood panel 10, the bottoms of the beads 11b have equal depths from the joining point surface 11a in the vehicle front-rear direction and in the vehicle right-left direction.

That is, in the conventional vehicle hood panel 10 shown in FIG. 28(a), on the outer side in the vehicle right-left direction from the side vertical wall 11d of the bead 11b, the joining point surface 11a joined to the outer panel 12 is formed. When a pedestrian collides with the panel, the stress applied to the hood panel 10 is propagated in the vehicle right-left direction through the bead 11b, and is propagated to the joining point surface 11a through the side vertical wall 11d at the end of the bead in the vehicle right-left direction. The stress is propagated in the vehicle front-rear direction through the joining point surface 11a and the vertical wall 14 therearound. The peak value of the first wave of acceleration can thus be higher. In addition, at the end of the bead 11b in the vehicle right-left direction, the joining point surface 11a is extended in the vehicle front-rear direction to connect the beads 11b. In particular, when the pedestrian collides with the vicinity of the end of the bead 11b, excessive bending deformation can be prevented from occurring. Further, the hat-shaped bead 11b is easily collapsed at contact with the incorporated components in the vehicle. With this, the amount of collision energy absorption can be increased to reduce the peak value of the second wave of acceleration.

Such a hood panel has the following problem. That is, in the conventional hood panel shown in FIGS. 28(a) to 28(c), the structure which propagates the collision energy in the vehicle front-rear direction is provided in the side vertical wall 11d at the end of the bead 11b in the vehicle right-left direction, the region at the end in the vehicle right-left direction of the joining point surface 11a communicated with the bottom of the bead 11b by the side vertical wall 11d, and the region at the end in the vehicle right-left direction of the vertical wall 14 surrounding the joining point surface 11a. Since the structure which propagates the stress at collision is provided only at the end in the vehicle right-left direction, the pedestrian protection performance of the hood panel is different between the center and the end in the vehicle right-left direction. That is, as shown in FIG. 29(b), near the side vertical wall 11d of the bead (portion I in FIG. 29(a)), by the rigidity of the vertical wall 14 surrounding the side vertical wall 11d and the joining point surface, the deformation acceleration is high at pedestrian collision, the deformation stroke is made shorter, and the deformation acceleration after the peak of the first wave of acceleration can be prevented from being suddenly lowered. On the other hand, near the center of the hood panel in the vehicle right-left direction (portion H in FIG. 29(a)), the distance from the side vertical wall 11d and the vertical wall 14 around the joining point surface 11a propagating the collision energy in the vehicle front-rear direction is great. In addition, the vertical walls 11c on the vehicle front and rear sides do not have the structure which restrains the planar portions from being inclined. The vertical walls 11c are easily spread-deformed. Therefore, the acceleration after the first wave of acceleration can be lower to increase the collision stroke. In addition, near each end in the vehicle front-rear direction, by the rigidity of the vertical wall 14, the deformation acceleration is high at pedestrian collision to shorten the deformation stroke, and the deformation acceleration after the peak of the first wave of acceleration can be prevented from being suddenly lowered, though not so significant as near the end in the vehicle right-left direction. However, the effect cannot be obtained near the center in the vehicle front-rear direction.

In the second conventional technique described in JP 3800601 B2, JP 2005-75176 A, JP 2008-247394 A, and JP 4395597 B2, the dent resistance immediately above the striker 206 is not sufficient, so that the hood rigidity is insufficient.

The present invention has been made in view of the first problem, and a first object of the present invention is to provide a vehicle hood panel which maintains the bending deformation performance at front collision of vehicles and has high pedestrian protection performance without depending on the collision position of the head of a pedestrian. The present invention has been made in view of the second problem, and a second object of the present invention is to provide a vehicle hood panel excellent in the pedestrian protection performance and dent resistance immediately above a striker to have high hood rigidity.

Means for Solving the Problems

A vehicle hood panel according to the present invention (a first invention) has an outer panel and an inner panel joined to each other, in which the inner panel has a joining point surface provided at a center thereof and joined to the outer panel by mastic, and a plurality of beads of concave cross section extended downwardly from edges of the joining point surface and extended in parallel in a vehicle right-left direction to be surrounded by the joining point surface, in which each bead has a bottom, a front vertical wall communicating the bottom with the edge of the joining point surface on a vehicle front side, a rear vertical wall communicating the bottom with the edge of the joining point surface on a vehicle rear side, and a side vertical wall communicating the bottom with each edge of the joining point surface in a vehicle right-left direction, and in which in at least one of the front vertical wall and the rear vertical wall, an upper edge thereof is curved so that in plan view, a radius of curvature at a center portion in the vehicle right-left direction is smaller than a radius of curvature at each end in the vehicle right-left direction.

In the vehicle hood panel according to the present invention, for instance, the vertical wall in which the upper edge is curved is curved so that the center portion in the vehicle right-left direction is convex to the vehicle front side in plan view, and has, between the center portion and the end in the vehicle right-left direction, an intermediate portion in which in plan view, the upper edge thereof is curved to be convex to the vehicle rear side and the radius of curvature thereat is larger than the radius of curvature at the center portion and is smaller than the radius of curvature at the end in the vehicle right-left direction. In addition, for instance, the vertical wall in which the upper edge is curved has, between the intermediate portion and the end in the vehicle right-left direction, a second intermediate portion in which in plan view, the upper edge thereof is curved to be convex to the vehicle front side and the radius of curvature thereat is larger than the radius of curvature at the intermediate portion and is smaller than the radius of curvature at the end in the vehicle right-left direction.

In the vehicle hood panel, for instance, in the vertical wall in which the upper edge is curved, the edge on the bottom side is curved so that in plan view, the radius of curvature at the center portion in the vehicle right-left direction is smaller than the radius of curvature at the end in the vehicle right-left direction. Alternatively, in the vertical wall in which the upper edge is curved, for instance, the lower edge thereof is flat in plan view.

For instance, preferably, in the vertical wall in which the upper edge is curved, the upper edge is curved in the position of 200 mm or more in the vehicle right-left direction from the side edge of the joining point surface in the vehicle right-left direction. In addition, preferably, the bottom of the bead is provided at a depth of 17.5 mm to 22.5 mm from the joining point surface, and is provided at an angle of 25° to 45° between the bottom and the front vertical wall and between the bottom and the rear vertical wall.

A vehicle hood panel according to the present invention (a second invention) has an outer panel and an inner panel joined to each other, in which the inner panel has a joining point surface provided at a center thereof and joined to the outer panel by mastic, and a plurality of beads of concave cross section extended downwardly from edges of the joining point surface and extended in parallel in a vehicle right-left direction to be surrounded by the joining point surface, in which each bead has a bottom, and a vertical wall communicating the bottom with the edge of the joining point surface, in which a depth of the bottom from the joining point surface of the bead at a center portion in a vehicle front-rear direction is greater than a depth of the bottom from the joining point surface of the bead at each end in the vehicle front-rear direction.

In the vehicle hood panel, preferably, in the bead at the center portion in the vehicle front-rear direction, the depth of the bottom from the joining point surface is greater at a center portion than at each end in the vehicle right-left direction. In this case, the bottom of the bead at the center portion in the vehicle front-rear direction is shallower at the end than at the center portion in the vehicle right-left direction.

Another vehicle hood panel according to the present invention has an outer panel, and an inner panel joined to the outer panel, in which the inner panel has a joining point surface provided at the center thereof and joined to the outer panel by mastic, and a plurality of beads of concave cross section extended downwardly from the edges of the joining point surface and extended in parallel in the vehicle right-left direction to be surrounded by the joining point surface, in which each bead has a bottom, and a vertical wall communicating the bottom with each edge of the joining point surface, in which the bottom of the bead at a center portion in the vehicle front-rear direction is deeper at a center portion than at each end in the vehicle right-left direction.

In the vehicle hood panel, for instance, an enveloping surface including the bottoms of the beads is inclined so that the depth from the joining point surface is increased from the end toward the center portion in the vehicle front-rear direction. In addition, preferably, in the bead at the center portion in the vehicle front-rear direction, the angle between the bottom and the vertical wall on the vehicle front side and the angle between the bottom and the vertical wall on the vehicle rear side are equal in the vehicle right-left direction.

In the vehicle hood panel, preferably, the bottom of the bead is provided at a depth of 17.5 mm to 22.5 mm from the joining point surface, and is provided at an angle of 25° to 45° between the bottom and the vertical wall on the vehicle front side and between the bottom and the vertical wall on the vehicle rear side.

A vehicle hood panel according to the present invention (a third invention) has an outer panel, an inner panel arranged below the outer panel, and a lock reinforcing member joined to a lower surface of the inner panel and supporting a striker on the lower surface side of the inner panel, in which the inner panel has a plurality of beads each having a bottom and a side, and a joining point surface surrounding an upper edge of a side of each bead, in which the joining point surface joins the inner panel to the outer panel, and in which in plan view, the joining point surface has a portion passing by a lateral side of the lock reinforcing member or the striker in a vehicle width direction to stretch to a portion closer to a vehicle rear side than the lock reinforcing member.

In this case, for instance, the joining point surface has an annular portion along the edge of the inner panel, and the portion passing by the lateral side of the lock reinforcing member stretches to the annular portion.

Further, for instance, the bead is disposed in the region surrounded by the annular portion of the joining point surface.

Furthermore, for instance, the joining portion of the lock reinforcing member to the inner panel on the vehicle rear side is joined to the end at the bottom of the bead in the vehicle front direction, and the joining portion of the lock reinforcing member to the inner panel on the vehicle front side is joined to the lower surface of the inner panel across the joining point surface.

Effect of the Invention

In the vehicle hood panel according to the present invention (the first invention), the inner panel has the joining point surface joined to the outer panel by mastic, and the beads of concave cross section are extended downwardly from the joining point surface and extended in the vehicle right-left direction to be surrounded by the joining point surface, and in at least one of the vertical walls of each bead on the vehicle front and rear sides, the upper edge thereof is curved so that in plan view, the radius of curvature at the center portion in the vehicle right-left direction is smaller than the radius of curvature at the end in the vehicle right-left direction. That is, since the bead is extended in the vehicle right-left direction, at front collision of vehicles, the hood panel is easily bending-deformed, and at pedestrian collision, the curved portions at the center portion of the vertical walls in which the radius of curvature is small in plan view act as reinforcing ribs to restrain the side walls from being spread-deformed. With this, according to the present invention, while the bending deformation performance at front collision of vehicles can be ensured, the pedestrian protection performance of the hood panel can be prevented from being non-uniform in the vehicle right-left direction. The pedestrian protection performance can be high without depending on the collision position of the head of a pedestrian. In particular, when the inner panel has the bead in which the bottom is curved to be convex to the vehicle front or rear side, the collision energy is easily propagated in the vehicle front-rear direction. With this, the amount of energy absorption in the initial stage of collision is increased to enhance the pedestrian protection performance.

In the vehicle hood panel according to the present invention (the second invention), the inner panel has the joining point surface joined to the outer panel by mastic, and the beads of concave cross section are extended downwardly from the joining point surface and extended in the vehicle right-left direction to be surrounded by the joining point surface, the depth of the bottom from the joining point surface of the bead at the center portion in the vehicle front-rear direction is greater than the depth of the bottom from the joining point surface of the bead at the end in the vehicle front-rear direction. Alternatively, the bottom of the bead at the center portion in the vehicle front-rear direction is deeper at the center portion than at the end in the vehicle right-left direction. Therefore, as compared with when the head of a pedestrian collides with the vicinity of the end of the hood panel, when the head of the pedestrian collides with the vicinity of the center of the hood panel, the timing at which the inner panel is subjected to secondary collision with the incorporated components inside the hood comes early, so that the deformation acceleration after primary collision can be restrained from being lowered. With this, at the center portion of the hood panel in the vehicle front-rear direction, the amount of energy absorption in the initial stage of collision is increased to reduce the peak value of the second wave of acceleration at secondary collision, thereby improving the pedestrian protection performance. On the other hand, at the end in the vehicle front-rear direction and in the vehicle right-left direction, by the rigidity of the vertical wall, the pedestrian protection performance can be stable. According to the present invention, the pedestrian protection performance can be high without depending on the collision position of the head of the pedestrian.

According to the present invention (the third invention), the mastic joining portion of the inner panel to the outer panel is provided near the striker at the vehicle front end. The dent resistance is easily ensured without setting the dent reinforcing member. In addition, the side of the bead that stretches to the mastic joining portion is present on the outer side of the striker in the vehicle width direction, thereby surrounding the striker. Therefore, the dent resistance and rigidity of the panel in the portion immediately above the striker can be easily ensured. Further, in the present invention, when the head of a pedestrian collides with the vicinity of the lock reinforcing member, the stress is easily propagated in the vehicle front-rear direction through the mastic joining surface. The deformation area in the initial stage of collision can be increased, and according to increase of the inertia mass, the primary peak of acceleration can be improved. With this, the amount of energy absorption in the first half of collision can be increased. The HIC value can thus be reduced to improve the pedestrian protection performance.

BRIEF DESCRIPTION OF THE DRAWINGS

FIG. 21(a) is a schematic diagram showing the cross-sectional structure of a vehicle hood panel according to an eighth embodiment of the present invention;

FIG. 21(b) is a bottom view thereof (only the half in the vehicle width direction is shown);

FIG. 22(a) is a schematic diagram showing the cross-sectional structure of a vehicle hood panel according to a ninth embodiment of the present invention;

FIG. 22(b) is a bottom view thereof (only the half in the vehicle width direction is shown);

FIG. 25(a) is a schematic diagram showing the cross-sectional structure of a vehicle hood panel according to a twelfth embodiment of the present invention;

FIG. 25(b) is a bottom view thereof (only the half in the vehicle width direction is shown);

FIG. 26(a) is a schematic diagram showing the cross-sectional structure of a vehicle hood panel according to a thirteenth embodiment of the present invention;

FIG. 26(b) is a bottom view thereof (only the half in the vehicle width direction is shown);

MODE FOR CARRYING OUT THE INVENTION

Hereinafter, the present invention will be described in detail.

(First Embodiment)

Figure 1:
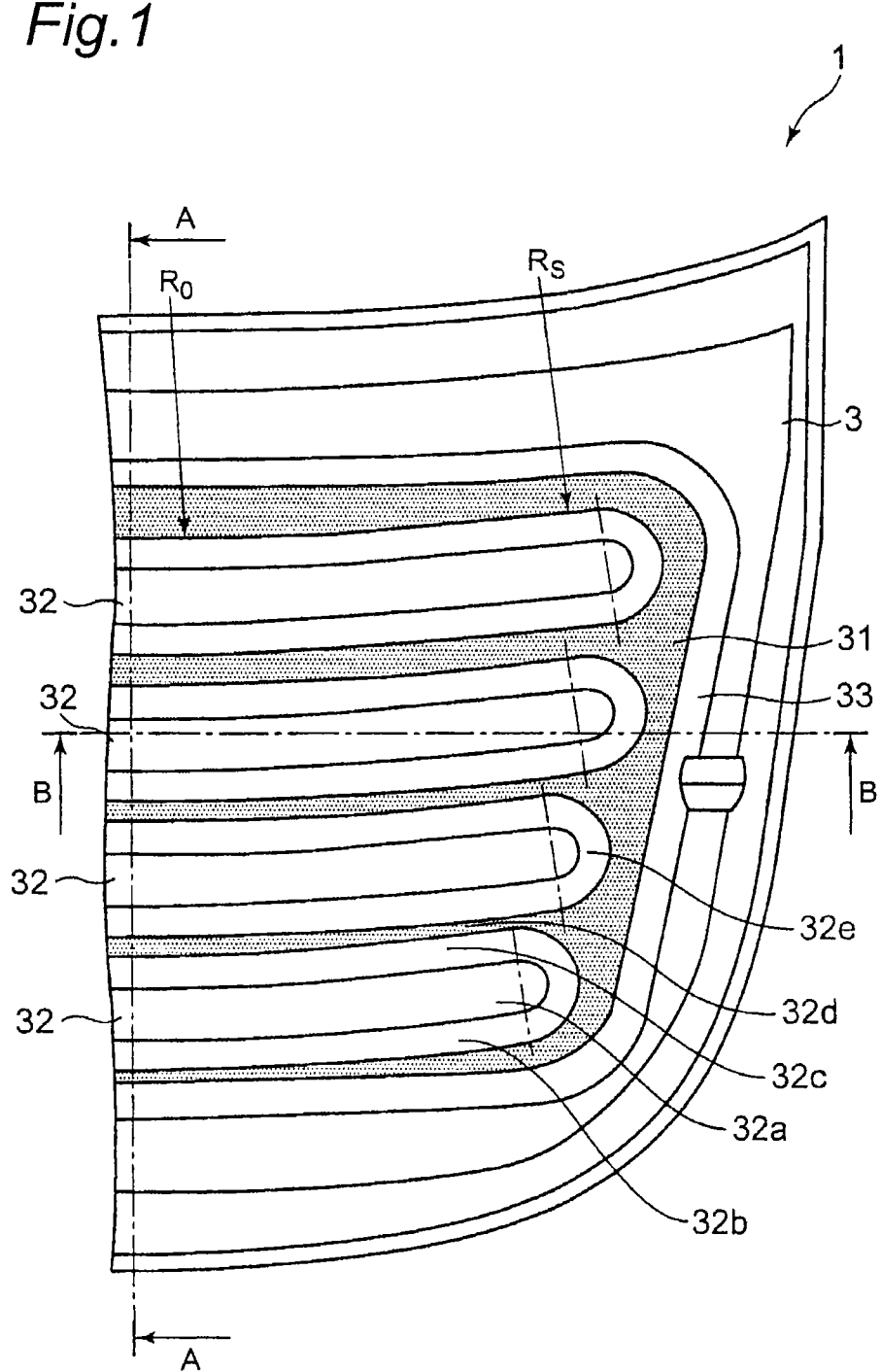
FIG. 1 is a plan view showing a vehicle hood panel according to a first embodiment of the present invention.
Figure 2A:
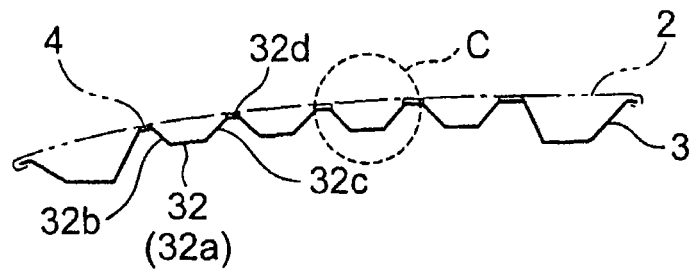
FIG. 2(a) is a cross-sectional view taken along line A-A in FIG. 1.
Figure 2B:
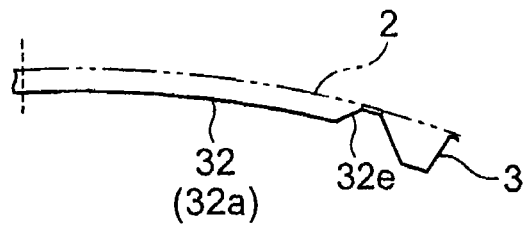
FIG. 2(b) is a cross-sectional view taken along line B-B in FIG. 1.
Figure 2C:
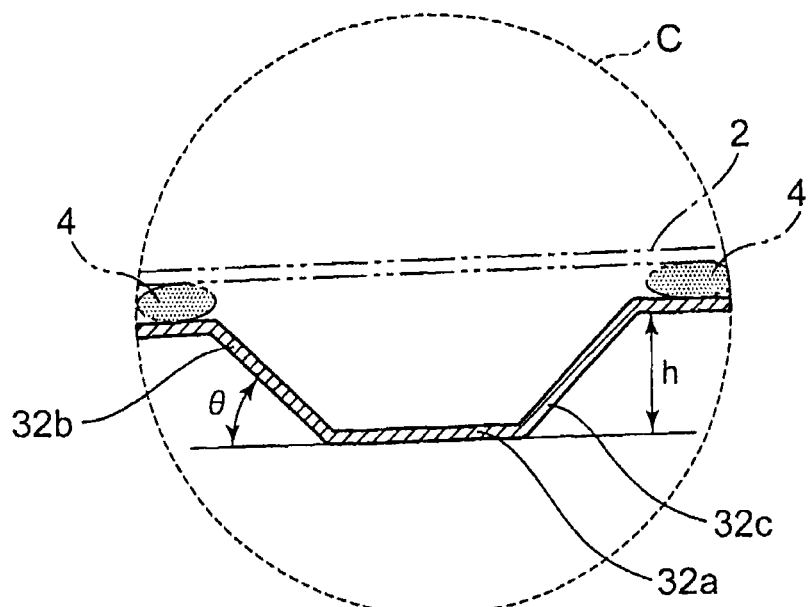
FIG. 2(c) is an enlarged view of portion C in FIG. 2(a)

The structure of a vehicle hood panel according to a first embodiment of the present invention will be described. FIG. 1 is a plan view showing the vehicle hood panel according to the first embodiment of the present invention. FIG. 2(a) is a cross-sectional view taken along line A-A in FIG. 1. FIG. 2(b) is a cross-sectional view taken along line B-B in FIG. 1. FIG. 2(c) is an enlarged view of portion C in FIG. 2(a). Like the conventional vehicle hood panel 10 shown in FIG. 28(a), as shown in FIG. 1, a vehicle hood panel 1 according to this embodiment has an inner panel 3, and an outer panel 2. For instance, the outer edge of the inner panel 3 is joined to the outer edge of the outer panel 2 by hemming. The inner panel 3 and the outer panel 2 are formed of a metal plate of e.g., iron, aluminum, or an aluminum alloy, and have a plate thickness of e.g., 0.7 mm to 1.1 mm. As shown in FIG. 1, at the center of the inner panel 3, a joining point surface 31 joined to the outer panel 2 by mastic is formed, a vertical wall 33 surrounding the periphery thereof. As shown in FIGS. 2(a) and 2(b), a mastic adhesive 4 made of e.g., an epoxy resin or a modified silicone resin is coated between the joining point surface 31 and the outer panel 2 to join the joining point surface 31 and the outer panel 2. The inner panel 3 has a plurality of beads 32 of concave cross section extended downwardly from the edges of the joining point surface 31 and extended in parallel in the vehicle right-left direction to be surrounded by the joining point surface 31. That is, a bottom 32a of each bead 32 is communicated with the joining point surface 31 by a vertical wall 32b on the vehicle front side, a vertical wall 32c on the vehicle rear side, and a side vertical wall 32e at each end in the vehicle right-left direction. The side vertical wall 32e which communicates the bottom 32a of the bead 32 with each edge of the joining point surface 31 in the vehicle right-left direction has e.g., a curved surface which connects the vertical wall 32b on the vehicle front side and the vertical wall 32c on the vehicle rear side.

Figure 28A:
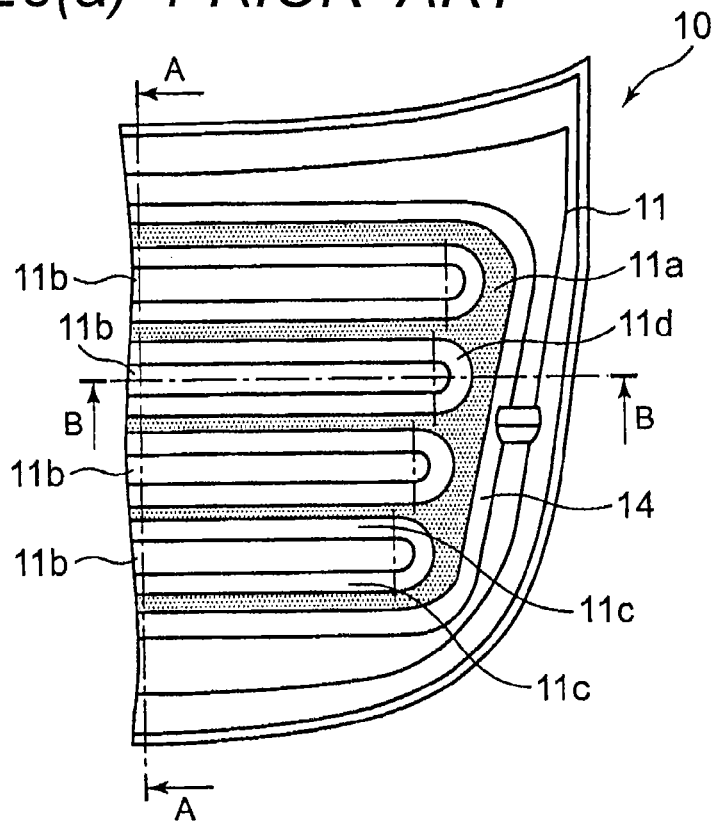
FIG. 28(a) is a plan view showing a conventional vehicle hood panel.
Figure 28B:
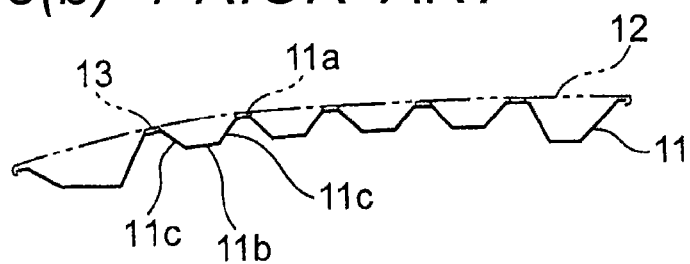
FIG. 28(b) is a cross-sectional view taken along line A-A in FIG. 28(a)
Figure 28C:
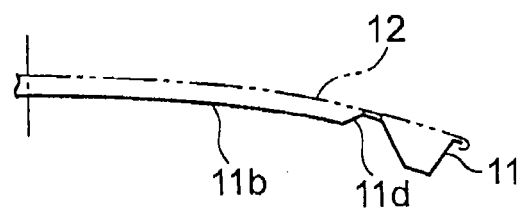
FIG. 28(c) is a cross-sectional view taken along line B-B in FIG. 28(a)
Figure 29A:
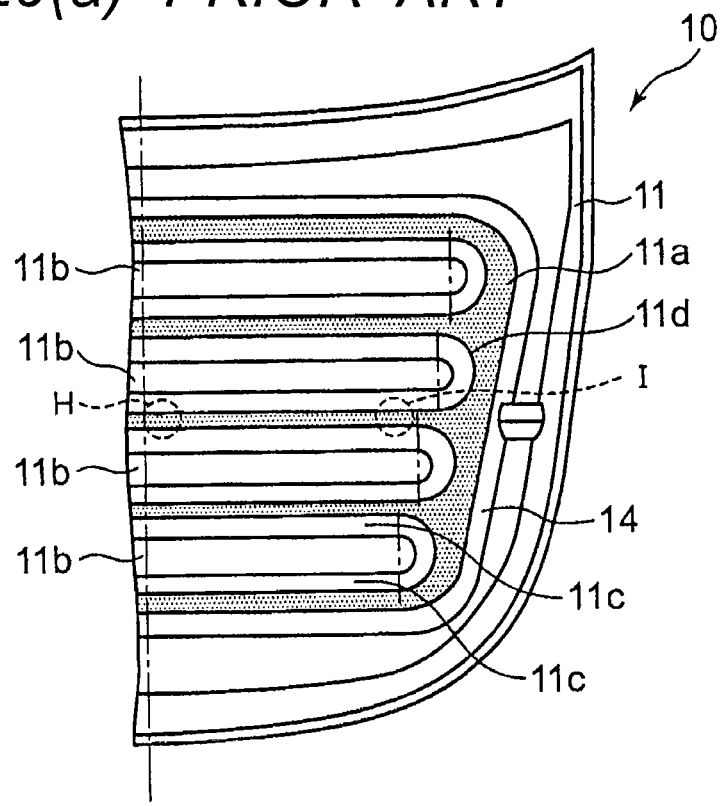
FIG. 29(a) is a plan view showing the conventional vehicle hood panel.
Figure 29B:
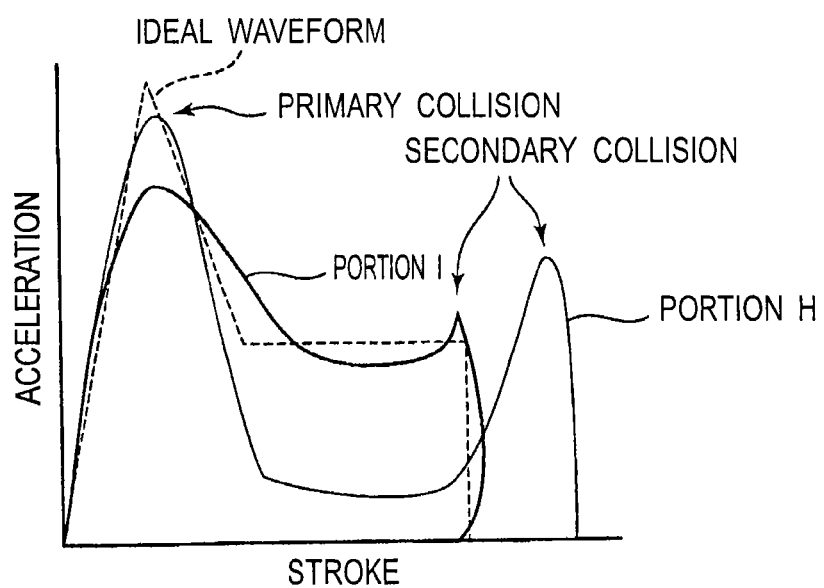
FIG. 29(b) is a graph showing the relation between the deformation acceleration and the stroke at pedestrian collision in the conventional vehicle hood panel.

In the conventional vehicle hood panel 10 shown in FIG. 28(a), both the vertical walls 11c on the vehicle front and rear sides are planar, and in plan view, are e.g., straight to be extended in the vehicle right-left direction so that the upper and lower edges thereof are flat. Therefore, when a pedestrian collides with the panel, the stress applied to the inner panel 11 is propagated in the vehicle right-left direction through the bead 11b, and is propagated to the joining point surface 11a through the side vertical wall 11d at the end of the bead in the vehicle right-left direction. The stress is also propagated in the vehicle front-rear direction through the joining point surface 11a and the vertical wall 14 therearound. The peak value of the first wave of acceleration can thus be higher. In addition, the hat-shaped bead 11b is easily collapsed at contact with the incorporated components in the vehicle. With this, the amount of collision energy absorption can be larger, so that the peak value of the second wave of acceleration can be lower. However, in the conventional vehicle hood panel 10, the structure which propagates the stress at collision is provided only at the end in the vehicle right-left direction. When the pedestrian collides with the vicinity of the center in the vehicle right-left direction, the stress propagated in the vehicle front-rear direction is made lower since the center in the vehicle right-left direction is far from the side vertical wall 11d and the vertical wall 14 around the joining point surface 11a propagating the collision energy in the vehicle front-rear direction. In addition, the conventional vehicle hood panel 10 is not provided with the structure which restrains the inclination angle of the planar portions of the vertical walls 11c from being changed at pedestrian collision. The vertical walls 11c are easily spread-deformed to lower the acceleration after the first wave of acceleration, so that the collision stroke is made longer. With this, the pedestrian protection performance of the hood panel is non-uniform in the vehicle right-left direction.

The present inventors have made various studies to solve the problems. Then, the present inventors have found that when in one of the vertical wall 32b on the vehicle front side and the vertical wall 32c on the vehicle rear side of the bead 32, the upper edge thereof is curved so that in plan view, the radius of curvature at the center portion in the vehicle right-left direction is smaller than the radius of curvature at the end in the vehicle right-left direction, while the above advantages at pedestrian collision with the hood panel can be maintained, the curved portion of the vertical wall has a component extended in the vehicle front-rear direction to act as a reinforcing rib, so that the bead 32 is less likely to be spread-deformed. In addition, the stress at pedestrian collision can be propagated in the vehicle front-rear direction through the bead having the curved portion, so that the peak value of the first wave of acceleration can be higher. From these findings, the present inventors have found the present invention which can prevent the pedestrian protection performance of the hood panel from being non-uniform in the vehicle right-left direction.

As shown in FIG. 1, in this embodiment, in the vehicle hood panel 1, the edges on the joining point surface 31 side of the vertical wall 32b on the vehicle front side and the vertical wall 32c on the vehicle rear side of the bead 32 are curved to be convex to the vehicle front side in plan view. In the curved edges, in plan view, the radius of curvature $R_0$ at the center portion in the vehicle right-left direction is smaller than the radius of curvature $R_s$ at the end in the vehicle right-left direction. In addition, in the vertical wall 32b on the vehicle front side and the vertical wall 32c on the vehicle rear side, the edges of the bead 32 on the bottom 32a side are curved to be convex to the vehicle front side. When the edges of the vertical walls 32b and 32c on the bottom 32a side are curved like this embodiment, in plan view, the radius of curvature at the center portion in the vehicle right-left direction is also preferably smaller than the radius of curvature at the end in the vehicle right-left direction.

In the present invention, to effectively prevent the pedestrian protection performance of the hood panel from being non-uniform in the vehicle right-left direction, as indicated by bead depth h in FIG. 2(c), the bead bottom 32a is preferably provided at a depth of 17.5 mm to 22.5 mm from a joining point surface 32d. In addition, as indicated by angle θ in FIG. 2(c), the bead bottom 32a is preferably provided at an angle of 25° to 45° between the bead bottom 32a and the vertical wall 32b on the vehicle front side and between the bead bottom 32a and the vertical wall 32c on the vehicle rear side. With this, when the bead 32 comes into contact with the incorporated components in the vehicle, the collision energy can be effectively absorbed without excessively increasing the peak value of the second wave of acceleration. When bead depth h is too small, the peak value of the first wave of acceleration is made lower at pedestrian collision, so that the amount of collision energy absorption in the initial stage of collision is insufficient. Consequently, the peak value of the second wave of acceleration is made higher to increase the HIC value (the pedestrian protection performance is lowered). In contrast, when the bead depth is too great, the time until collision with the incorporated components inside the hood is longer, so that secondary collision occurs while the collision energy in the initial stage of collision cannot be sufficiently absorbed. Consequently, the peak value of the second wave of acceleration is made higher to increase the HIC value (the pedestrian protection performance is lowered). In addition, when the angle between the bead bottom 32a and the vertical wall 32b and between the bead bottom 32a and the vertical wall 32c exceeds 45°, at press-molding of the bead 32 onto the inner panel 3, the molded portion is easily fractured since the inclination angle of the vertical walls is large. On the other hand, when the inclination angle between the bead bottom 32a and the vertical wall 32b and between the bead bottom 32a and the vertical wall 32c is reduced to be less than 25°, the bead 32 of hat-shaped cross section is easily spread-deformed, in particular, in the portion close to the outer panel 2 (the mastic joining surface 31). Consequently, the acceleration after the first wave of acceleration at pedestrian collision is made lower. The panel comes into contact with the incorporated components while the collision energy cannot be sufficiently absorbed, so that the peak value of the second wave of acceleration is made higher.

The operation of the vehicle hood panel according to the first embodiment will be described. When the pedestrian collides with the hood panel 1, the impact is propagated to the outer panel 2 which is deformed near the collision portion. The deformation stress is then propagated through the joining point surface 31 to the inner panel 3 near the collision portion. In this embodiment, the bead 32 is extended in the vehicle right-left direction. Therefore, at pedestrian collision, the stress applied to the inner panel 3 is propagated in the vehicle right-left direction through the bead 32. The bead 32 is communicated with the joining point surface 31 by the side vertical wall 32e at the end in the vehicle right-left direction. The stress at collision propagated in the vehicle right-left direction through the bead 32 is thus propagated through the side vertical wall 32e to the joining point surface 31. The stress is also propagated in the vehicle front-rear direction through the joining point surface 31 and the vertical wall 33 therearound. The peak value of the first wave of acceleration can thus be higher.

In addition to the above structure, in this embodiment, in the vertical wall 32b on the vehicle front side and the vertical wall 32c on the vehicle rear side of the bead 32, the upper edges thereof on the joining point surface 31 side are curved to be convex to the vehicle front side in plan view, and in the curved upper edges, in plan view, the radius of curvature $R_0$ at the center portion in the vehicle right-left direction is smaller than the radius of curvature $R_s$ at the end in the vehicle right-left direction. That is, curved portion D of each of the vertical walls 32b and 32c near the center portion in the vehicle right-left direction shown in FIG. 3(a) has a component extended in the vehicle front-rear direction to act as a reinforcing rib. At pedestrian collision, the bead 32 is thus less likely to be spread-deformed. In addition, the bottom of the bead 32 is curved to be convex to the vehicle front or rear side. The stress applied to the inner panel 3 is propagated, not only to the side vertical wall 32e, but also to the vertical wall 32b on the vehicle front side and the vertical wall 32c on the vehicle rear side. The stress can thus be effectively propagated in the vehicle front-rear direction. In the conventional inner panel, the structure which propagates the stress applied to the inner panel in the vehicle front-rear direction is provided only in the side vertical wall at the end of the bead in the vehicle right-left direction, and the structure which restrains the planar portions of the vertical walls on the front and rear sides from being inclined is not provided at the center in the vehicle right-left direction. Consequently, the vertical walls are easily spread-deformed. With this, the pedestrian protection performance of the hood panel is non-uniform in the vehicle right-left direction. However, like this embodiment, the vertical wall 32b on the front side and the vertical wall 32c on the rear side of the bead have components extended in the vehicle front-rear direction. Therefore, near the center portion in which the acceleration after the peak of the first wave of acceleration is lowered more greatly than at the end in the vehicle right-left direction and in the vehicle front-rear direction, the vertical walls can thus be restrained from being spread-deformed. Since the bead 32 itself is curved, the stress at pedestrian collision can be propagated in the vehicle front-rear direction through the vertical walls 32b and 32c. The acceleration after the peak of the first wave of acceleration can thus be maintained high. The stress is distributed in the vehicle right-left direction, so that the pedestrian protection performance of the hood panel can be prevented from being non-uniform in the vehicle right-left direction. That is, according to the hood panel of this embodiment, as shown in FIG. 3(b), the difference between the deformation acceleration at portion D near the center portion of the bead 32 in the vehicle right-left direction and the deformation acceleration at portion E near the side vertical wall 32e can be smaller. The waveform of the first wave of acceleration at primary collision can be close to the ideal waveform indicated by the dashed line in FIG. 3(b).

With further deformation of the hood panel 1 due to pedestrian collision, in the inner panel 3, the downwardly projected bead 32 comes into contact with the incorporated components inside the hood (secondary collision). In this embodiment, without depending on the collision place of the pedestrian, the amount of collision energy absorption due to primary collision is large, and by the rigidity of the vertical walls 32b, 32c, and 32e acting as reinforcing ribs, the acceleration after the first wave of acceleration can be maintained high. Therefore, at portion D near the center portion of the bead 32 in the vehicle right-left direction, the collision stroke can be prevented from being longer. In addition, the hat-shaped bead 32 is easily collapsed at contact with the incorporated components in the vehicle. Therefore, even when the collision speed is high and the inner panel 3 easily comes into contact with the incorporated components below the hood, the magnitude of the second wave of acceleration at secondary collision can be smaller. As indicated by the thick lines in FIG. 3(b), the waveforms can be close to the ideal waveform (the dashed line in FIG. 3(b)) at pedestrian collision. The HIC value can be lower without depending on the collision portion.

In this embodiment, the hat-shaped bead is extended in the vehicle right-left direction. At front collision of vehicles, the hood panel is easily bending-deformed in doglegged shape in side view. The collision energy can be efficiently absorbed, so that the panel can be restrained from entering into the vehicle.

In the first embodiment, both the vertical walls 32b and 32c of the bead 32 in the inner panel 3 are curved. However, when at least one of the vertical 32b on the vehicle front side and the vertical 32c on the vehicle rear side of the bead 32 is curved, the effect of the present invention can be obtained.

In addition, in the present invention, in the vertical walls 32b and 32c of the bead 32, at least the upper edges thereof on the joining point surface 31 side should be curved so that in plan view, the radius of curvature at the center portion in the vehicle right-left direction is smaller than the radius of curvature at the end in the vehicle right-left direction. Unlike this embodiment, the edges of the vertical walls 32b and 32c on the bottom 32a side are not required to be curved.

Further, in this embodiment, in plan view, the curved edges of the vertical walls 32b and 32c are convex to the vehicle front side, but may be convex to the vehicle rear side.

(Second Embodiment)

Figure 4:
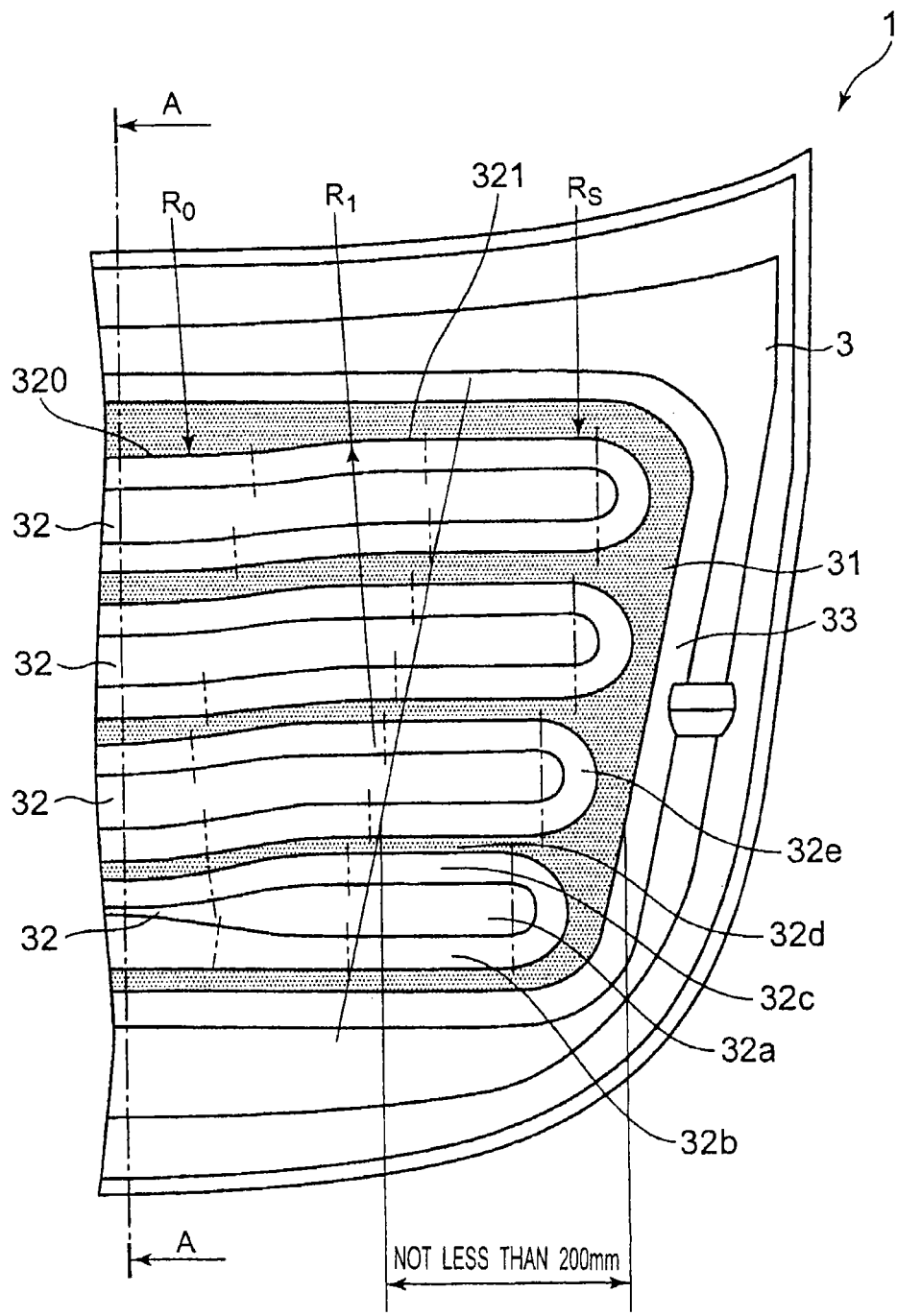
FIG. 4 is a plan view showing a vehicle hood panel according to a second embodiment of the present invention.
Figure 5A:
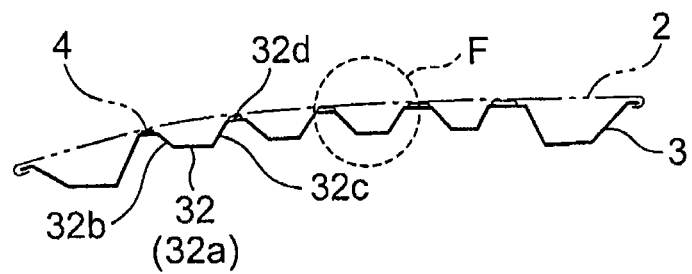
FIG. 5(a) is a cross-sectional view taken along line A-A in FIG. 4.
Figure 5B:
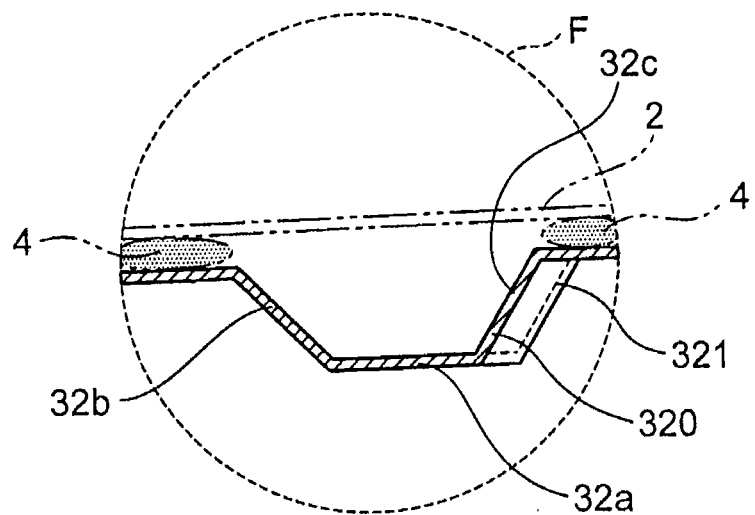
FIG. 5(b) is an enlarged view of portion F in FIG. 5(a)

A vehicle hood panel according to a second embodiment of the present invention will be described. FIG. 4 is a plan view showing the vehicle hood panel according to the second embodiment of the present invention. FIG. 5(a) is a cross-sectional view taken along line A-A in FIG. 4. FIG. 5(b) is an enlarged view of portion F in FIG. 5(a). In the bead 32 of this embodiment, in at least one of the vertical wall 32b on the vehicle front side and the vertical wall 32c on the vehicle rear side, the upper edge thereof is curved so that in plan view, the radius of curvature at the center portion in the vehicle right-left direction is smaller than the radius of curvature at the end in the vehicle right-left direction. In addition, as shown in FIG. 4, in the bead 32, a center portion 320 in the vehicle right-left direction is curved to be convex to the vehicle front side in plan view. In this embodiment, an intermediate portion 321 is provided between the center portion 320 and the end in the vehicle right-left direction so that the edge thereof on the joining point surface 31 side is convex to the vehicle rear side in plan view. In the intermediate portion 321, in plan view, the radius of curvature $R_1$ is larger than the radius of curvature $R_0$ at the center portion and is smaller than the radius of curvature $R_s$ at the end. When the intermediate portion 321 is provided like this embodiment, as shown in FIG. 4, the curved portion of the intermediate portion 321 is preferably provided in the position of 200 mm or more in the vehicle right-left direction from the side edge of the joining point surface 31.

In the feature of the bead 32 of this embodiment, only in the center portion 320 in the vehicle right-left direction and the intermediate portion 321 therearound in which the acceleration after the first wave of acceleration at pedestrian collision is lower to make the collision stroke longer so that the HIC value is likely to be increased, the vertical wall 32b on the vehicle front side or the vertical wall 32c on the vehicle rear side or both are curved. That is, in this embodiment, in the bead 32, both the vertical wall 32b on the vehicle front side and the vertical wall 32c on the vehicle rear side are plan in the range within 200 mm in the vehicle right-left direction from the side edge of the joining point surface 31, where both the upper and lower edges are flat in plan view. Preferably, these flat edges are provided in parallel in the vehicle right-left direction in plan view. In addition, in the center portion 320 in the vehicle right-left direction and the intermediate portion 321 therearound in the position of 200 mm or more in the vehicle right-left direction from the side edge of the joining point surface 31, at least one of the vertical wall 32b on the vehicle front side and the vertical wall 32c on the vehicle rear side of the bead 32 is curved. That is, in this embodiment, since at least one of the vertical walls has a curved surface, the bead 32 can be effectively restrained from being spread-deformed. The acceleration after the peak of the first wave of acceleration can thus be prevented from being suddenly lowered. Near the center portion in the vehicle right-left direction, the stress at pedestrian collision is propagated in the vehicle front-rear direction through the curved vertical wall 32*b* on the vehicle front side or the vertical wall 32*c* on the vehicle rear side or both. Near the end of the bead 32 in the vehicle right-left direction, the stress is propagated through the side vertical wall 32*e*. With this, the pedestrian protection performance can be prevented from being non-uniform in the vehicle right-left direction.

In this embodiment, in the curved upper edges of the vertical walls 32*b* and 32*c*, in plan view, the radius of curvature $R_0$ at the center portion 320 in the vehicle right-left direction is smaller than the radius of curvature RS at the end in the vehicle right-left direction. Therefore, as shown in FIG. 5(*b*), the curved portions near the center portion in the vehicle right-left direction have components extended in the vehicle front-rear direction to act as reinforcing ribs. Therefore, like the first embodiment, at pedestrian collision, the bead 32 is less likely to be spread-deformed. In addition, the stress applied to the inner panel 3 is propagated, not only to the side vertical wall 32*e*, but also to the vertical wall 32*b* on the vehicle front side and the vertical wall 32*c* on the vehicle rear side. With this, the stress applied due to collision can be propagated through the vertical walls 32*b* and 32*c* to the joining point surface 31 located in the front-rear direction. Besides this, in this embodiment, in plan view, the radius of curvature $R_1$ at the intermediate portion 321 is larger than the radius of curvature $R_0$ at the center portion 320 and is smaller than the radius of curvature $R_s$ at the end. Therefore, in the curved portions of the vertical walls acting as reinforcing ribs, the components extended in the vehicle front-rear direction become greater toward the center in the vehicle right-left direction, so that the shape of the curved portions becomes gradually close to the shape of the side vertical wall 32*e*. In this way, by stepwisely providing the effects of the curved portions as reinforcing ribs, the pedestrian protection performance can be prevented from being non-uniform in the vehicle right-left direction more effectively.

In this embodiment, the vertical walls 32*b* and 32*c* of the bead 32 are planar near the side of the bead 32. At pedestrian collision, the bead 32 can be easily spread-deformed at secondary collision (with the incorporated components inside the hood). At front collision of vehicles, the hood panel is easily bending-deformed.

The operation of the vehicle hood panel of this embodiment will be described. In this embodiment, when the pedestrian collides with the hood panel 1, the impact is propagated to the outer panel 2 which is deformed near the collision portion. The deformation stress is then propagated through the joining point surface 31 to the inner panel 3 near the collision portion. In this embodiment, the bead 32 is extended in the vehicle right-left direction. Therefore, at pedestrian collision, the stress applied to the inner panel 3 is propagated in the vehicle right-left direction through the bead 32. The bead 32 is communicated with the joining point surface 31 by the side vertical wall 32*e* at the end in the vehicle right-left direction. The stress at collision propagated in the vehicle right-left direction through the bead 32 is also propagated in the vehicle front-rear direction through the side vertical wall 32*e* and the joining point surface 31. The peak value of the first wave of acceleration can thus be higher. In addition, in this embodiment, the bead 32 has the curved portions in the vehicle right-left direction. Near the center portion in which the acceleration after the peak of the first wave of acceleration is lowered more greatly than at the end in the vehicle right-left direction and in the vehicle front-rear direction, the acceleration can be prevented from being suddenly lowered, and the vertical walls can be restrained from being spread-deformed. Like the first embodiment, the pedestrian protection performance of the hood panel can be prevented from being non-uniform in the vehicle right-left direction.

In this embodiment, in the bead 32 in the inner panel 3, the vertical wall 32*b* on the vehicle front side or the vertical wall 32*c* on the vehicle rear side or both are curved only in the center portion 320 in the vehicle right-left direction and the intermediate portion 321 therearound in which the HIC value is likely to be increased, and the vertical walls 32*b* and 32*c* are planar near the end in the vehicle right-left direction. Therefore, when the pedestrian collides with the vicinity of the center portion 320 in the vehicle right-left direction in the position of 200 mm or more in the vehicle right-left direction from the side edge of the joining point surface 31, the stress applied to the inner panel 3 due to collision is propagated to the joining point surface 31 in the vehicle front-rear direction through the curved portions of the vertical walls 32*b* and 32*c* near the center portion 320 and the intermediate portion 321. On the other hand, when the pedestrian collides with the vicinity of the side of the bead 32 in the range within 200 mm in the vehicle right-left direction from the side edge of the joining point surface 31, the stress applied to the inner panel 3 is propagated to the joining point surface 31 and the outer panel 2 through the side vertical wall 32*e* of the bead 32.

At the same time, as shown in FIG. 4, in the curved upper edges of the vertical walls 32*b* and 32*c*, in plan view, the radius of curvature $R_0$ at the center portion 320 is smaller than the radius of curvature $R_s$ at the end in the vehicle right-left direction, and the radius of curvature $R_s$ at the intermediate portion 321 between the center portion 320 and the end of the bead 32 is larger than the radius of curvature $R_0$ at the center portion 320 and is smaller than the radius of curvature $R_s$ at the end. Therefore, the curved portions of the vertical walls acting as reinforcing ribs become less likely to be deformed toward the center in the vehicle right-left direction. That is, although at the center portion in the vehicle front-rear direction and in the vehicle right-left direction, which is far from the side vertical wall 32*e*, the acceleration after the first wave of acceleration is greatly lowered with respect to the impact load from the upper side at pedestrian collision, by stepwisely providing the effects of the curved portions as reinforcing ribs like this embodiment, the inner panel 3 become less likely to be deformed toward the center in the vehicle right-left direction. Therefore, the pedestrian protection performance can be effectively prevented from being non-uniform in the vehicle right-left direction.

With further deformation of the hood panel 1 due to pedestrian collision, in the inner panel 3, the downwardly projected bead 32 comes into contact with the incorporated components inside the hood (secondary collision). In this embodiment, the amount of energy absorption in the initial stage of collision can be larger without depending on the collision place of the pedestrian, so that by the rigidity of the vertical walls 32*b* and 32*c*, the acceleration after the first wave of acceleration can be maintained high. Therefore, near the center portion 320 (and the intermediate portion 321) of the bead 32, the collision stroke can be prevented from being longer, the magnitude of the second wave of acceleration at secondary collision can be smaller, and the HIC value can be lower without depending on the collision portion. At the same time, in this embodiment, the vertical walls 32*b* and 32*c* of the bead 32 are planar near the end in the vehicle right-left direction. At secondary collision, the hat-shaped bead 32 is easily spread-deformed and collapsed due to collision with the incorporated components inside the hood. The magnitude of the second wave of acceleration can be smaller, so that the pedestrian protection performance is high.

The hat-shaped bead is extended in the vehicle right-left direction. Further, the vertical walls 32b and 32c of the bead 32 are planar near the side of the bead 32. Therefore, like the first embodiment, at front collision of vehicles, the hood panel is easily bending-deformed in doglegged shape in side view. The collision energy can be efficiently absorbed, so that the panel can be restrained from entering into the vehicle.

Figure 6:
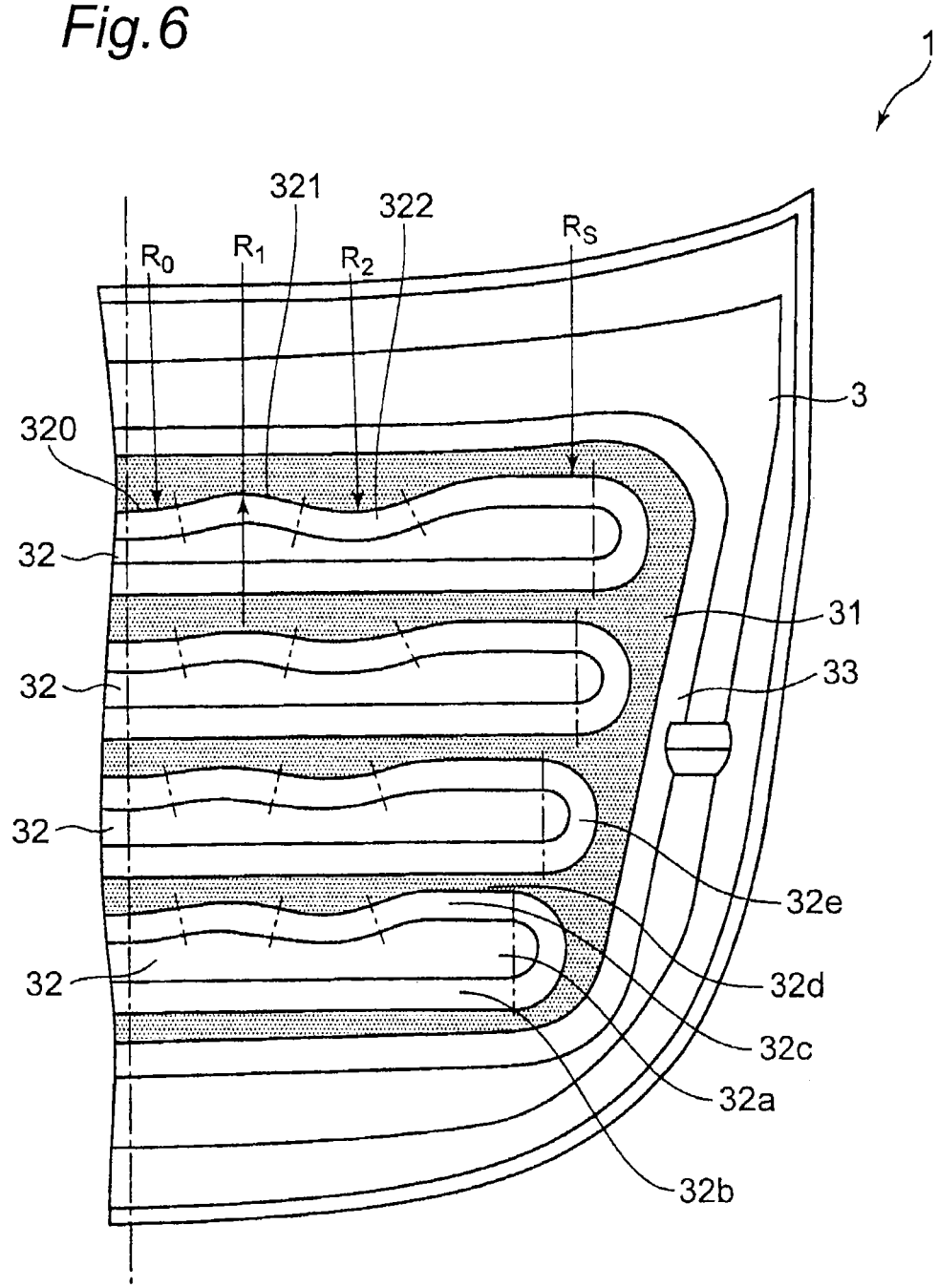
FIG. 6 is a plan view showing a modification of the vehicle hood panel according to the second embodiment of the present invention.

In this embodiment, near the center portion 320 in the vehicle right-left direction, provided is the intermediate portion 321 in which the upper edge is convex to the vehicle rear side in plan view. However, between the center portion 320 and the end in the vehicle right-left direction, a plurality of intermediate portions may be provided. FIG. 6 is a plan view showing a modification of the vehicle hood panel according to the second embodiment. As shown in FIG. 6, in this modification, a second intermediate portion 322 is provided between the intermediate portion 321 which is convex to the vehicle rear side in plan view and the end of the bead 32 in the vehicle right-left direction, so that the upper edge of the second intermediate portion 322 is convex to the vehicle front side in plan view. In this case, in plan view, the radius of curvature of the curved portions becomes larger toward the center in the vehicle right-left direction. When $R_2$ is the radius of curvature at the second intermediate portion 322 in plan view, the relation of $R_0 > R_1 > R_2 > R_s$ is preferably satisfied. The stress can be propagated more uniformly over the curved surfaces, so that the pedestrian protection performance can be prevented from being non-uniform.

(Third Embodiment)

Figure 7A:
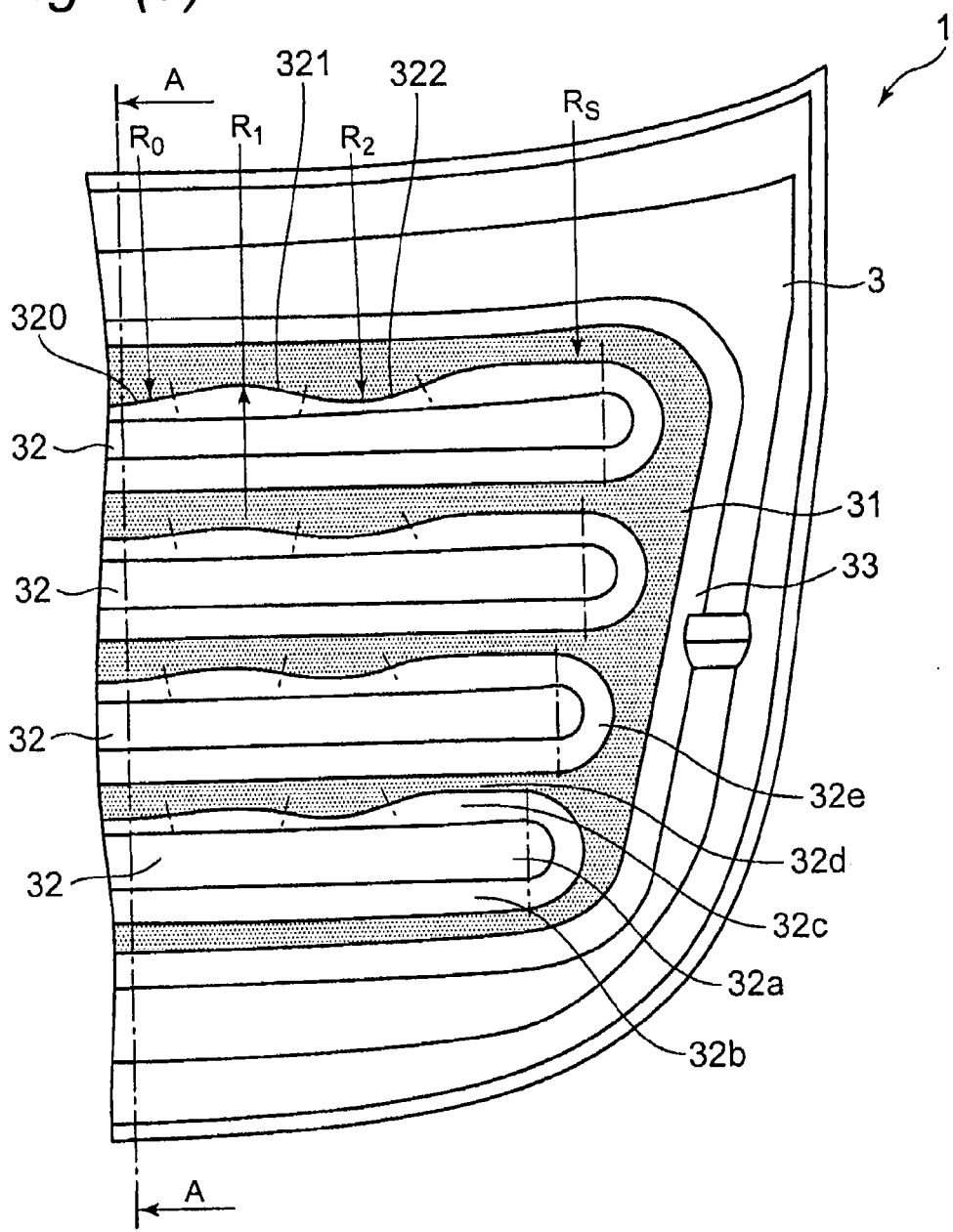
FIG. 7(a) is a plan view showing a vehicle hood panel according to a third embodiment of the present invention.
Figure 7B:
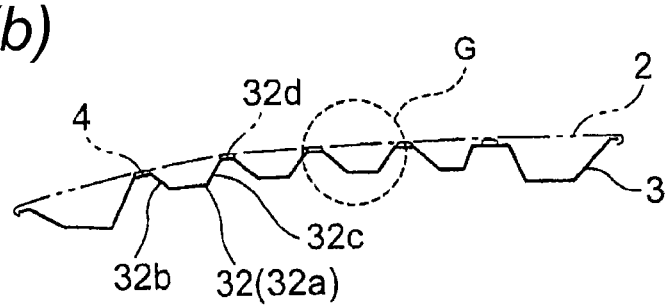
FIG. 7(b) is a cross-sectional view taken along line A-A in FIG. 7(a)
Figure 8A:
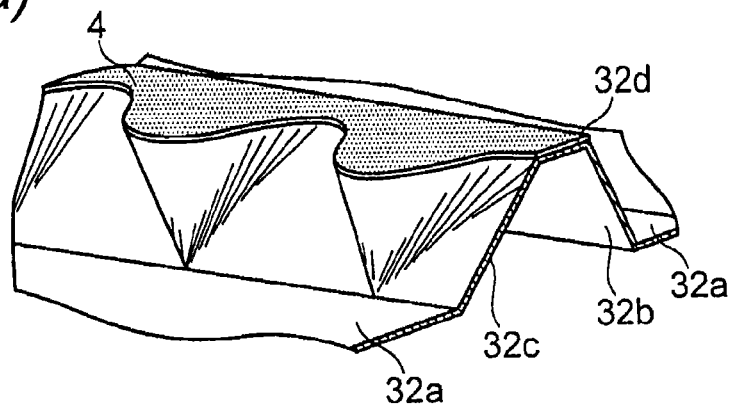
FIG. 8(a) is a perspective view of portion G in FIG. 7(b)
Figure 8B:
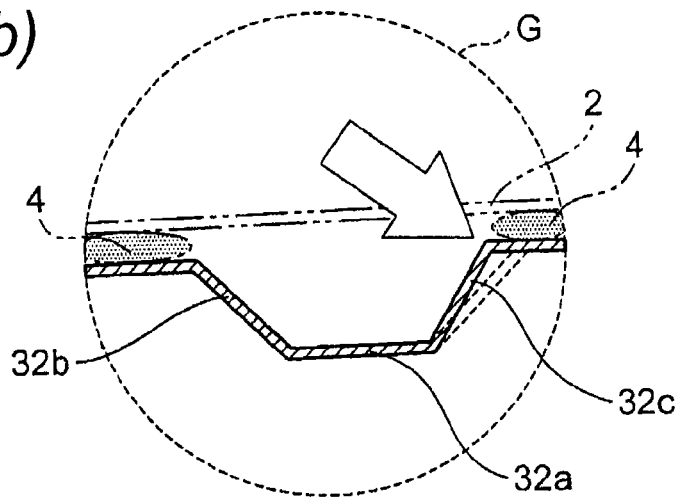
FIGS. 8(b) and 8(c) are enlarged views of portion G.
Figure 8C:
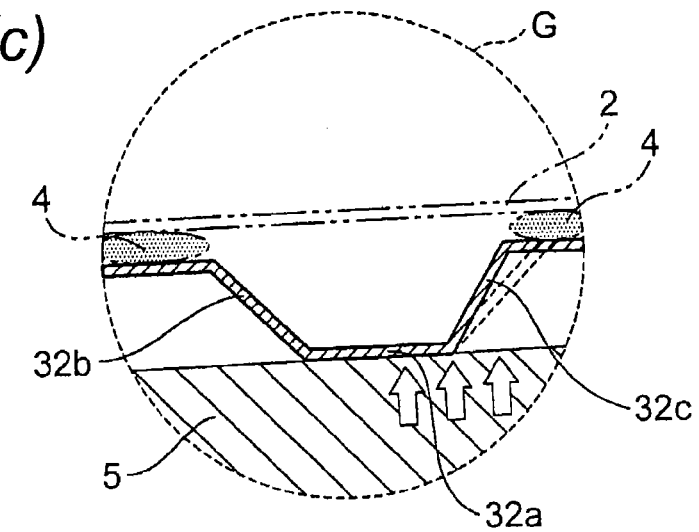

A vehicle hood panel according to a third embodiment of the present invention will be described. FIG. 7(a) is a plan view showing the vehicle hood panel according to the third embodiment of the present invention. FIG. 7(b) is a cross-sectional view taken along line A-A in FIG. 7(a). FIG. 8(a) is a perspective view of portion G in FIG. 7(b). FIGS. 8(b) and 8(c) are enlarged views of portion G. This embodiment is the same as the first and second embodiments in that in at least one of the vertical wall 32b on the vehicle front side and the vertical wall 32c on the vehicle rear side, the upper edge thereof on the joining point surface 31 side is curved so that in plan view, the radius of curvature at the center in the vehicle right-left direction is smaller than the radius of curvature at the end in the vehicle right-left direction. However, this embodiment is different from the second embodiment shown in FIG. 4 in that in the curved portions of the vertical walls 32b and 32c, the edges on the bottom 32a side are flat in plan view. That is, the edges of the vertical walls 32b and 32c on the bottom 32a side are straight or arcuate with a large radius of curvature in plan view. Therefore, as shown in FIG. 8(a), the curved portion in which the vertical wall 32c is projected to the inner side of the bead 32 has a curved surface so that the radius of curvature becomes smaller from the upper side to the lower side. Like the second embodiment, in this embodiment, the curved portions of the vertical walls 32b and 32c are preferably provided in the position of 200 mm or more in the vehicle right-left direction from the side edge of the joining point surface 31.

Figure 3A:
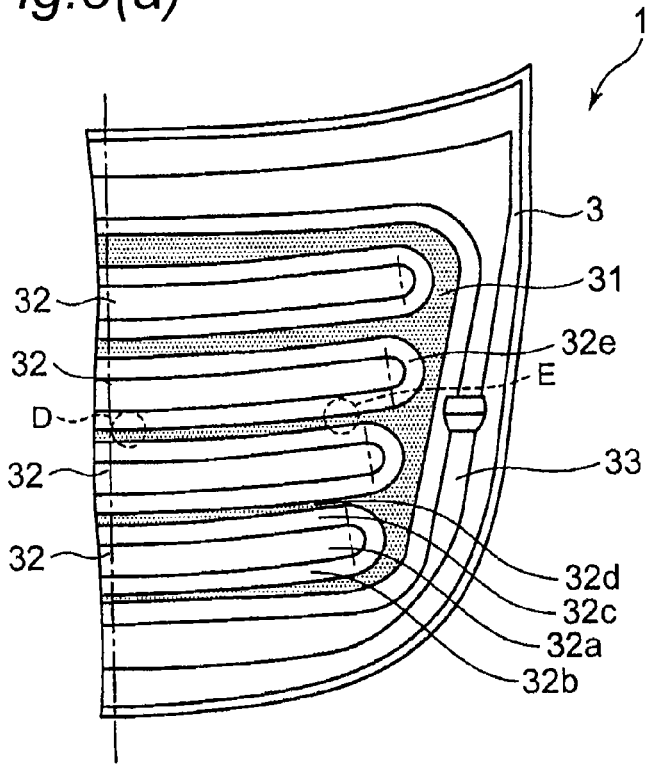
FIG. 3(a) is a plan view showing the vehicle hood panel according to the first embodiment of the present invention.
Figure 3B:
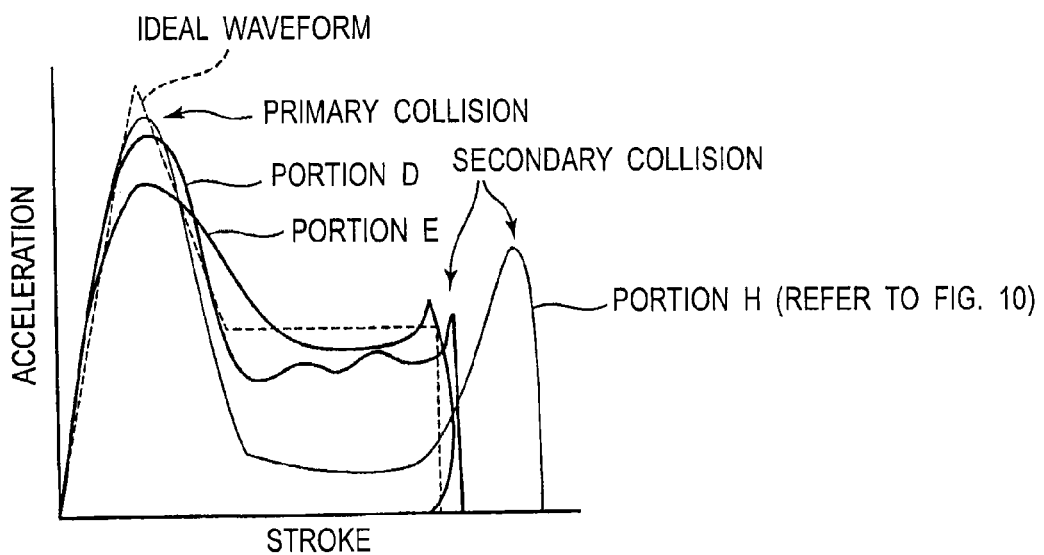
FIG. 3(b) is a graph showing the relation between the deformation acceleration and the stroke at pedestrian collision in the vehicle hood panel according to the first embodiment of the present invention.

The hood panels shown in FIGS. 6 and 7(a) are different from the hood panels shown in FIGS. 1 and 3(a) in that at least one edge of the bottom 32a of the bead 32 in the vehicle front-rear direction is straight or arcuate with a large radius of curvature in plan view. In this case, as compared with when the vertical walls 32b and 32c are curved in their entirety, the effect of propagating the stress in the vehicle front-rear direction by the vertical walls 32b and 32c is slightly lower, so that the amount of collision energy absorption is slightly smaller. However, the effect that the vertical walls act as reinforcing ribs can be sufficiently obtained. The side walls can be restrained from being spread-deformed without depending on the collision portion of a pedestrian. The amount of energy absorption in the initial stage of collision can thus be increased. The effect of enhancing the pedestrian protection performance can be sufficiently obtained.

In this embodiment, the bead 32 is extended in the vehicle right-left direction. Therefore, at pedestrian collision, the stress applied to the inner panel 3 is propagated in the vehicle right-left direction through the bead 32, and is further propagated in the vehicle front-rear direction through the side vertical wall 32e and the joining point surface 31. With this, the peak value of the first wave of acceleration can be higher. In addition, the hat-shaped bead 32 is easily collapsed at secondary collision at contact with the incorporated components in the vehicle. With this, the peak value of the second wave of acceleration can be lower.

In addition, at least one of the vertical wall 32b on the vehicle front side and the vertical wall 32c on the vehicle rear side has, at the center portion thereof, a component extended in the vehicle front-rear direction. The bead 32 is less likely to be spread-deformed with respect to the stress from the upper side at pedestrian collision. The stress applied to the inner panel 3 is propagated to the joining point surface 31 in the vehicle front-rear direction through not only the side vertical wall 32e, but also the vertical walls 32b and 32c acting as reinforcing ribs. The pedestrian protection performance of the hood panel can be prevented from being non-uniform in the vehicle right-left direction, so that the HIC value can be lower without depending on the collision portion.

The hat-shaped bead is extended in the vehicle right-left direction. Therefore, at front collision of vehicles, the hood panel is easily bending-deformed in doglegged shape in side view. The collision energy can be efficiently absorbed, so that the panel can be restrained from entering into the vehicle. In addition, the vertical walls 32b and 32c of the bead 32 are planar near the side of the bead 32. At pedestrian collision, the bead 32 can be easily spread-deformed at secondary collision (with the incorporated components inside the hood). At front collision of vehicles, the hood panel is easily bending-deformed.

In addition to these effects, in this embodiment, the curved portion in which the vertical wall 32c is projected to the inner side of the bead 32 has a curved surface in which the height of the convex portion becomes gradually smaller from the upper side to the lower side. Therefore, as shown in FIG. 8(b), at the upper edge of the vertical wall 32c on the joining point surface 32d side, the component extended in the vehicle front-rear direction is larger in side view. This portion thus acts as a reinforcing rib in the vertical wall 32c. As shown in FIG. 8(b), the bead 32 can be restrained from being spread-deformed with respect to the impact load from the upper side, so that the stress can be effectively distributed in the vehicle right-left direction. On the other hand, at the edge of the vertical wall 32c on the bottom 32a side, the component extended in the vehicle front-rear direction is small. Therefore, as shown in FIG. 8(c), this portion is easily spread-deformed with respect to the load from the lower side. At pedestrian collision, the bead 32 can be easily spread-deformed at secondary collision (with incorporated components 5 inside the hood). At front collision of vehicles, the hood panel is easily bending-deformed.

In the curved edges of the vertical walls 32b and 32c, the radius of curvature becomes smaller toward the center in the vehicle right-left direction in plan view. The stress can be propagated over the curved surfaces more uniformly, so that the pedestrian protection performance can be prevented from being non-uniform.

The curved portions of the vertical walls 32b and 32c are provided in the position of 200 mm or more in the vehicle right-left direction from the side edge of the joining point surface 31. The same effect as in the second embodiment can thus be obtained.

(Fourth Embodiment)

Figure 9A:
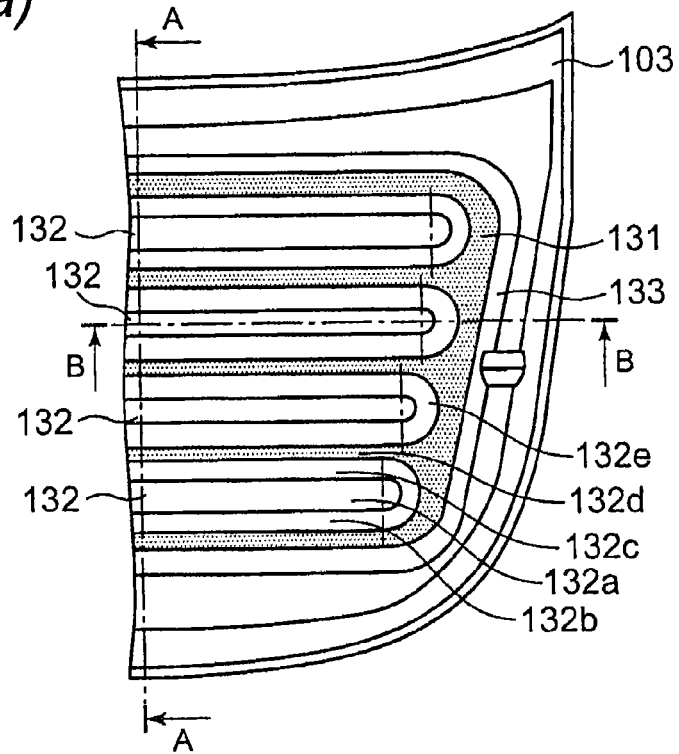
FIG. 9(a) is a plan view showing a vehicle hood panel according to a fourth embodiment of the present invention.
Figure 9B:
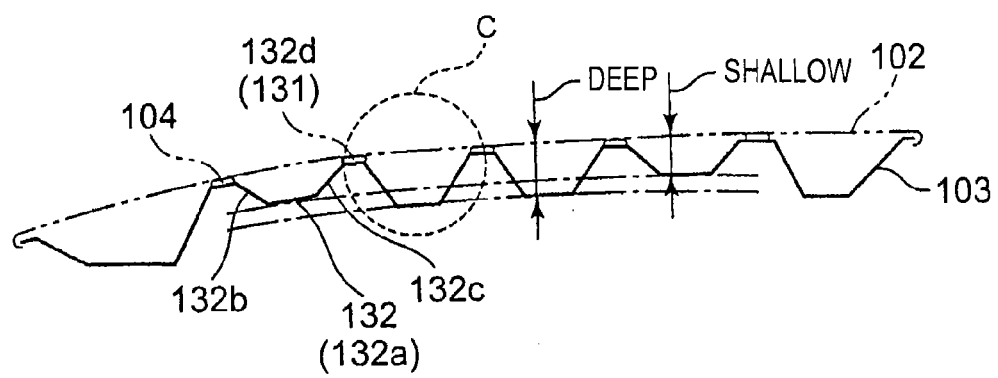
FIG. 9(b) is a cross-sectional view taken along line A-A in FIG. 9(a)
Figure 9C:
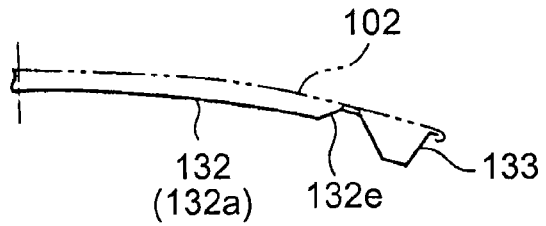
FIG. 9(c) is a cross-sectional view taken along line B-B in FIG. 9(a)
Figure 10:
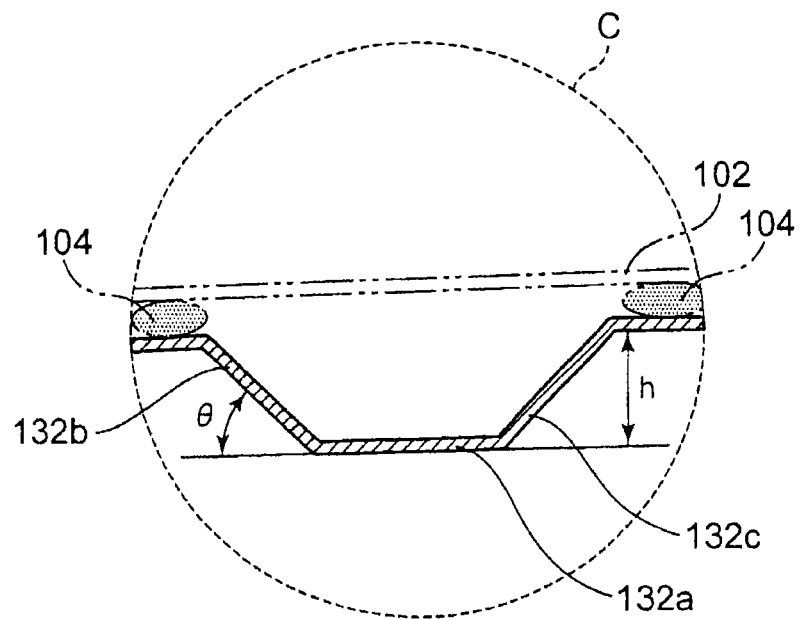
FIG. 10 is an enlarged view of portion C in FIG. 9(b)

A vehicle hood panel according to a fourth embodiment of the present invention will be described. FIG. 9(*a*) is a plan view showing the vehicle hood panel according to the fourth embodiment of the present invention. FIG. 9(*b*) is a cross-sectional view taken along line A-A in FIG. 9(*a*). FIG. 9(*c*) is a cross-sectional view taken along line B-B in FIG. 9(*a*). FIG. 10 is an enlarged view of portion C in FIG. 9(*b*). Like the conventional vehicle hood panel 10 shown in FIG. 30(*a*), as shown in FIG. 9(*a*), a vehicle hood panel 101 according to this embodiment has an inner panel 103, and an outer panel 102. For instance, the outer edge of the inner panel 103 is joined to the outer edge of the outer panel 102 by hemming. The inner panel 103 and the outer panel 102 are formed of a metal plate of e.g., iron, aluminum, or an aluminum alloy, and have a plate thickness of e.g., 0.7 mm to 1.1 mm. As shown in FIG. 9(*a*), at the center of the inner panel 103, a joining point surface 131 joined to the outer panel 102 by mastic is formed, a vertical wall 133 surrounding the periphery thereof. As shown in FIGS. 9(*b*) and 9(*c*), a mastic adhesive 104 made of e.g., an epoxy resin or a modified silicone resin is coated between the joining point surface 131 and the outer panel 102 to join the joining point surface 131 and the outer panel 102. The inner panel 103 has a plurality of beads 132 of concave cross section extended downwardly from the edges of the joining point surface 131 and extended in parallel in the vehicle right-left direction to be surrounded by the joining point surface 131. That is, a bottom 132a of each bead 132 is communicated with the joining point surface 131 by a vertical wall 132b on the vehicle front side, a vertical wall 132c on the vehicle rear side, and a side vertical wall 132e at each end in the vehicle right-left direction. The side vertical wall 132e which communicates the bottom 132a of the bead 132 with each edge of the joining point surface 131 in the vehicle right-left direction has e.g., a curved surface which connects the vertical wall 132b on the vehicle front side to the vertical wall 132c on the vehicle rear side.

Figure 30A:
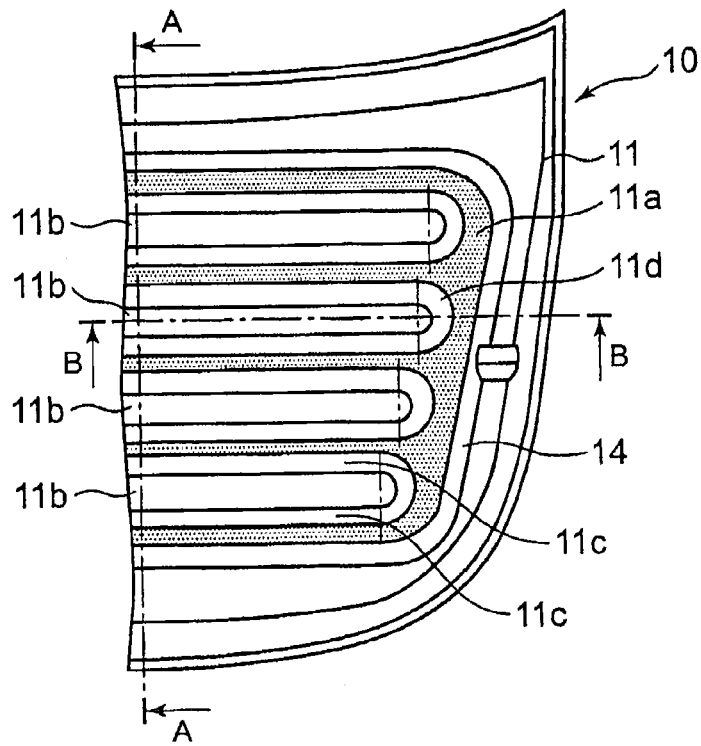
FIG. 30(a) is a plan view showing the conventional vehicle hood panel.
Figure 30B:
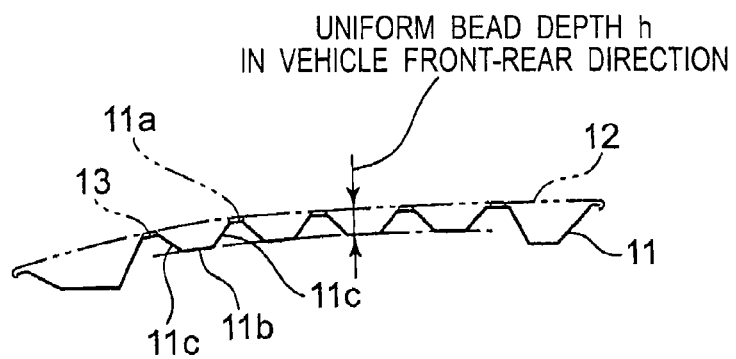
FIG. 30(b) is a cross-sectional view taken along line A-A in FIG. 30(a)
Figure 30C:
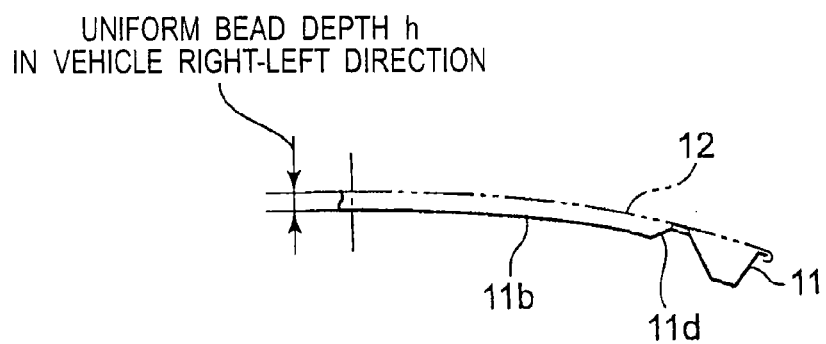
FIG. 30(c) is a cross-sectional view taken along line B-B in FIG. 30(a)
Figures 31A, 31B:
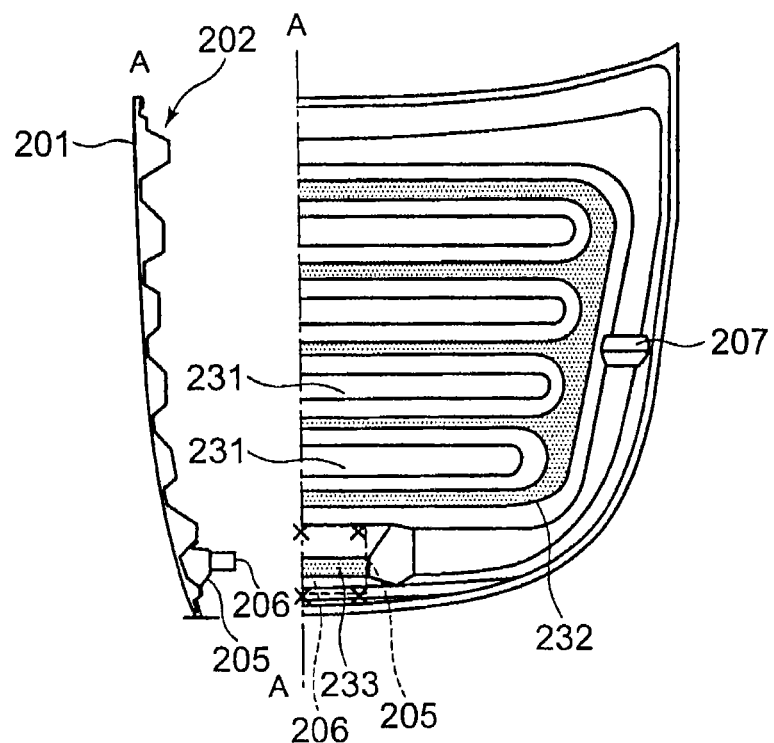
FIG. 31(a) is a schematic diagram showing the cross-sectional structure of a conventional vehicle hood.
FIG. 31(b) is a bottom view thereof (only the half in the vehicle width direction is shown).

Like the conventional vehicle hood panel 10 shown in FIG. 30(*a*), in this embodiment, both the vertical wall 132b on the vehicle front side and the vertical wall 132c on the vehicle rear side are planar, and in plan view, are e.g., straight to be extended in the vehicle right-left direction so that the upper and lower edges thereof are flat. Therefore, when a pedestrian collides with the panel, the stress applied to the inner panel 103 is propagated in the vehicle right-left direction through the bead 132, and is propagated to the joining point surface 131 through the side vertical wall 132e at the end of the bead in the vehicle right-left direction. The stress is also propagated in the vehicle front-rear direction through the joining point surface 131 and the vertical wall 133 therearound, so that the peak value of the first wave of acceleration can be higher. In addition, the hat-shaped bead 132 is easily collapsed at contact with the incorporated components in the vehicle. With this, the amount of collision energy absorption can be larger, so that the peak value of the second wave of acceleration can be lower.

However, in such a structure, the structure which propagates the stress applied to the inner panel in the vehicle front-rear direction is provided in the side vertical wall 132e at the end of the bead 132 in the vehicle right-left direction, the region at the end in the vehicle right-left direction of the joining point surface 131 communicated with the bottom of the bead 132, and the region at the end in the vehicle right-left direction of the vertical wall 133 surrounding the joining point surface 131. When the head of a pedestrian collides with the center portion of the hood panel in the vehicle right-left direction, that is, in particular, with the portion far from the portion of the joining point surface 131 extended in the vehicle front-rear direction and from the vertical walls around the joining point surface, since the structure which restrains the inclination angle of the planar portions of the vertical walls 132b and 132c from being changed is not provided, the vertical walls 132c are easily spread-deformed. Consequently, the acceleration after the first wave of acceleration is made lower, so that the collision stroke is made longer. With this, the pedestrian protection performance of the hood panel is non-uniform, in particular, in the vehicle right-left direction. In addition, when the head of the pedestrian collides with each end in the vehicle front-rear direction, although the vertical wall 133 in the outer periphery of the joining point surface 131 resists deformation thereby restraining the acceleration from being lowered, the influence of the vertical walls is lesser near the center portion than at the end in the front-rear direction. The pedestrian protection performance is thus low.

To solve this problem, the present inventors have made various studies and found the following. The depth of the bottom from the joining point surface of the bead at the center portion in the vehicle front-rear direction is made greater than the depth of the bottom from the joining point surface of the bead at the end in the vehicle front-rear direction. Alternatively, in the bead at the center in the vehicle front-rear direction, the bottom is made deeper at the center than at the end in the vehicle right-left direction. While the above advantages when the pedestrian collides with the hood panel can be maintained, the bead at the center portion of the hood panel in the vehicle front-rear direction in which the deformation acceleration after primary collision is significantly lowered is subjected to secondary collision with the incorporated components below the inner panel at early timing. With this, the deformation acceleration after primary collision can be restrained from being lowered, so that the amount of collision energy absorption at primary collision can be prevented from being smaller. Further, the peak value of the second wave of acceleration at secondary collision can be lower to improve the pedestrian protection performance.

In this embodiment, as shown in FIG. 9(*a*), the vehicle hood panel 101 has four beads 132 aligned in the vehicle front-rear direction. As shown in FIG. 9(*b*), the bead depth of two beads 132 at the center portion is greater than the bead depth of two beads 132 at both ends. In this embodiment, as shown in FIG. 9(*c*), the bead depth of the beads 132 is uniform in the vehicle right-left direction.

In the present invention, to effectively prevent the pedestrian protection performance of the hood panel from being non-uniform in the vehicle right-left direction, as indicated by bead depth h in FIG. 10, the bead bottom 132a is preferably provided at a depth of 17.5 mm to 22.5 mm from the joining point surface 131. In this embodiment, depth h from the joining point surface 131 to the bead bottom 132a is greater at each bead 132 at the center portion in the vehicle front-rear direction than at the bead 132 at the end in the vehicle front-rear direction. The preferable range of bead depth h is the range applied to all the beads 132.

As indicated by angle θ in FIG. 10, the bead bottom 132a is preferably provided at an angle of 25° to 45° between the bead bottom 132a and the vertical wall 132b on the vehicle front side and between the bead bottom 132a and the vertical wall 132c on the vehicle rear side. With this, when the bead 132 comes into contact with the incorporated components in the vehicle, the amount of collision energy absorption can be effectively larger. When bead depth h is too small, the peak value of the first wave of acceleration is made lower at pedestrian collision, so that the amount of collision energy absorption in the initial stage of collision is insufficient. Consequently, the peak value of the second wave of acceleration is made higher to increase the HIC value (the pedestrian protection performance is lowered). In contrast, when the bead depth is too great, the time until collision with the incorporated components inside the hood is made longer, so that secondary collision occurs while the collision energy in the initial stage of collision cannot be sufficiently absorbed. Consequently, the peak value of the second wave of acceleration is made higher to increase the HIC value (the pedestrian protection performance is lowered). In addition, when the angle between the bead bottom 132a and the vertical wall 132b and between the bead bottom 132a and the vertical wall 32c exceeds 45°, at press-molding of the bead 132 onto the inner panel 103, the molded portion is easily fractured since the inclination angle of the vertical walls is large. In addition, at secondary collision, the vertical walls collide with the incorporated components inside the hood at an entering angle close to a vertical angle with respect to the incorporated components, so that the bead can be restrained from being collapsed or deformed. The deformation stroke until the peak value of the second wave of acceleration is made shorter, so that the peak value of the second wave of acceleration is likely to be higher. On the other hand, when the inclination angle between the bead bottom 132a and the vertical wall 132b and between the bead bottom 132a and the vertical wall 132c is reduced to be less than 25°, the bead 132 of hat-shaped cross section is easily spread-deformed, in particular, in the portion close to the outer panel 102 (the joining point surface ). Consequently, the acceleration after the first wave of acceleration at pedestrian collision is made lower, so that the stroke at collision is likely to be longer.

The operation of the vehicle hood panel according to the fourth embodiment will be described. When the pedestrian collides with the hood panel 101, the impact is propagated to the outer panel 102 which is deformed near the collision portion. The deformation stress is then propagated through the joining point surface 131 to the inner panel 103 near the collision portion. When the pedestrian collides with the vicinity of the end of the hood panel 101 in the vehicle right-left direction (portion E in FIG. 11(a)), as shown in FIG. 11(b), the vertical walls 132e and 133 resist deformation. The deformation acceleration at primary collision is high, so that lowering of the deformation acceleration after primary collision can be reduced. Therefore, the amount of collision energy absorption at primary collision can be larger, the peak value of the second wave of acceleration at secondary collision can be smaller, and the deformation stroke can be shorter. In the bead 132 near the end of the hood panel 101 in the vehicle front-rear direction, when the pedestrian collides with the vicinity of the center portion in the vehicle right-left direction (portion F in FIG. 11(a)), the vertical wall 133 resists deformation. The relation between the deformation acceleration and the deformation stroke is thus the same as that at portion E.

Figure 11A:
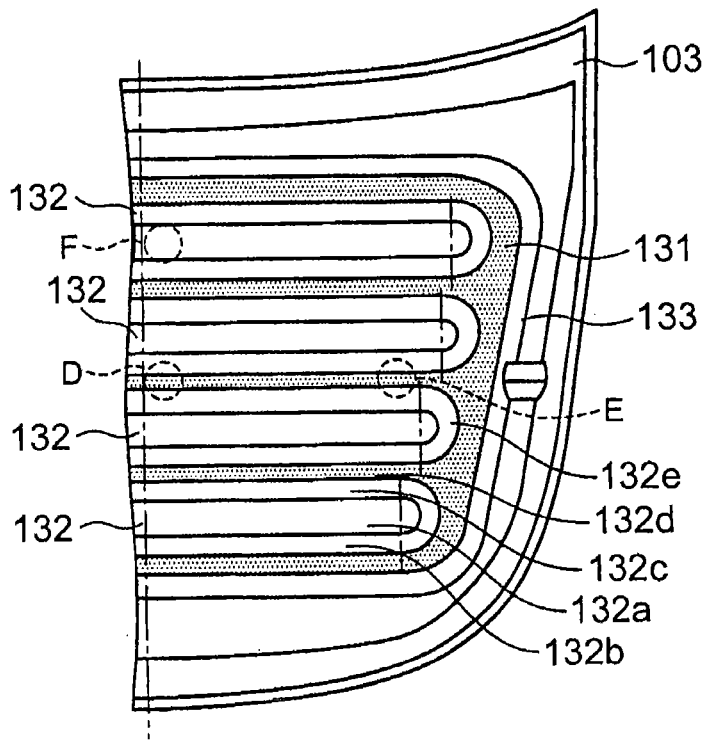
FIG. 11(a) is a plan view showing a vehicle hood panel according to the fourth embodiment of the present invention.
Figure 11B:
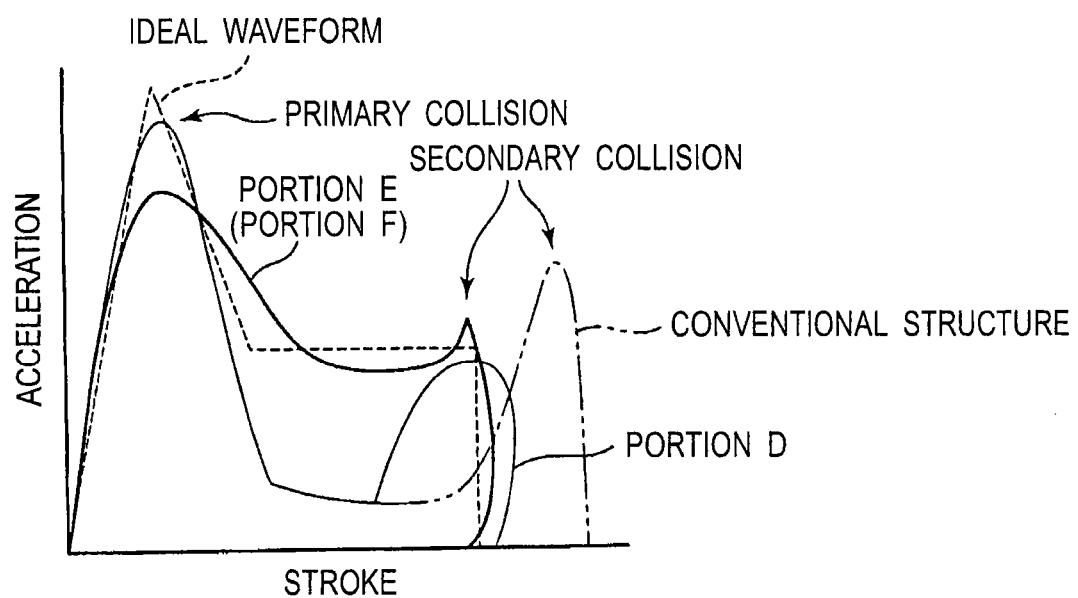
FIG. 11(b) is a graph showing the relation between the deformation acceleration and the stroke at pedestrian collision in the vehicle hood panel according to the fourth embodiment of the present invention.

On the other hand, when the pedestrian collides with the vicinity of the center portion of the hood panel 101 in the vehicle front-rear direction and in the vehicle right-left direction (portion D in FIG. 11(a)), the stress applied to the inner panel 103 is propagated in the vehicle right-left direction through the bead 132 extended in the vehicle right-left direction. At the end in the vehicle right-left direction, the bead 132 is communicated with the joining point surface 131 by the side vertical wall 132e. Further, the joining point surface 131 is communicated with the vertical wall 133 therearound. The stress propagated in the vehicle right-left direction through the bead 132 is propagated in the vehicle front-rear direction through the side vertical wall 132e and the joining point surface 131. With this, the peak value of the first wave of acceleration can be higher. However, the center portion in the vehicle front-rear direction and in the vehicle right-left direction is far from the side vertical wall 132e and the vertical wall 133 around the joining point surface 131. In addition, in the vertical wall 132b on the vehicle front side and the vertical wall 132c on the vehicle rear side, the structure which restrains the planar portions from being inclined is not provided. The vertical walls 132b and 132c are thus easily spread-deformed. As shown in FIG. 11(b), after the first wave of acceleration reaches the peak value, the deformation acceleration is suddenly lowered.

In this embodiment, the depth of the bottom from the joining point surface 131 of the bead 132 at the center portion of the hood panel 101 in the vehicle front-rear direction is greater than the depth of the bottom from the joining point surface 131 of the bead 132 at the end in the vehicle front-rear direction. Alternatively, in the bead at the center portion in the vehicle front-rear direction, the bottom is deeper at the center portion than at the end in the vehicle right-left direction. Therefore, when the head of the pedestrian collides with the vicinity of the center portion of the hood panel, the bead 132 at the center portion comes into contact with the incorporated components inside the hood earlier than the bead at the end. As shown in FIG. 11(b), the period during which the deformation acceleration is low can be shortened.

In the vertical wall 133 in the outer periphery of the joining point surface and near the side vertical wall 132e, the deformation resistance is high. Therefore, when the head of the pedestrian collides with the region in which the acceleration after the peak of the first wave of acceleration indicates a relatively high value, that is, with the vicinity of the end of the hood panel in the vehicle right-left direction or with the vicinity of the end of the hood panel in the vehicle front-rear direction, due to the smaller bead depth than in the center portion, increase of the HIC value due to increase of the collision acceleration in the later stage of collision can thus be prevented. That is, according to the hood panel 101 of this embodiment, the HIC value can be lower without depending on the collision portion of the pedestrian.

With further deformation of the hood panel 101 due to pedestrian collision, in the period during which the bead at the center portion in the vehicle front-rear direction is collapsed and deformed, the bead at the end is subjected to secondary collision with the incorporated components inside the hood and is started to be collapsed and deformed. That is, the period during which the bead at the center portion in the vehicle front-rear direction is collapsed and deformed due to secondary collision is made longer than the period during which the bead at the end in the vehicle front-rear direction is collapsed and deformed due to secondary collision. Then, the beads at the center portion and at the end in the vehicle front-rear direction are collided with the incorporated components inside the hood, and are collapsed and deformed. Therefore, the deformation stress due to secondary collision can be distributed in the vehicle front-rear direction. As shown in FIG. 11(b), in the bead at the center portion in the vehicle front-rear direction, the peak value of the second wave of acceleration due to secondary collision can be lower, so that the collision stroke can be prevented from being longer. That is, according to the hood panel 101 of this embodiment, the HIC value can be lower without depending on the collision portion of the pedestrian.

In this embodiment, the hat-shaped bead is extended in the vehicle right-left direction. Therefore, at front collision of vehicles, the hood panel is easily bending-deformed in doglegged shape in side view. The collision energy can be efficiently absorbed to restrain the panel from entering into the vehicle.

Figure 12:
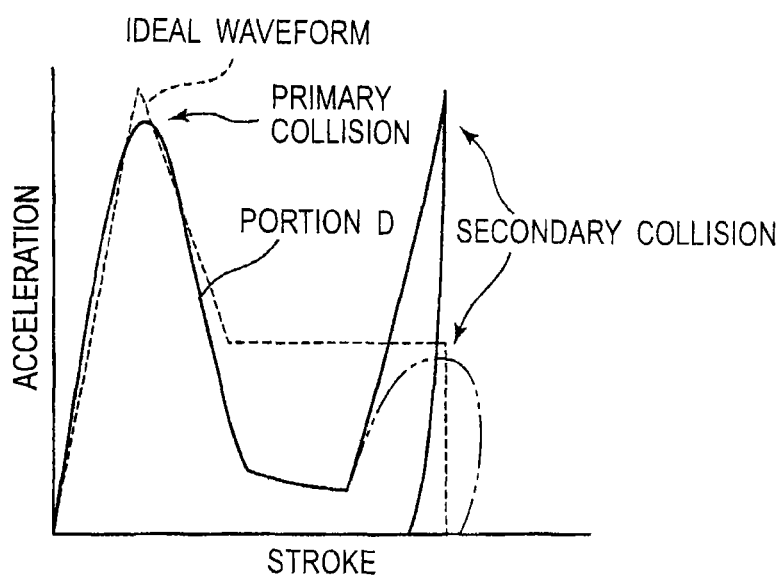
FIG. 12 is a graph showing the relation between the deformation acceleration and the stroke at pedestrian collision when the inclination angle of front and rear vertical walls with respect to a bottom of a bead is changed.

Referring to FIG. 12, in the vehicle hood panel of this embodiment, the reason for the definition of the upper limit value of angle θ between the bead bottom 132a and the vertical wall 132b on the vehicle front side and between the bead bottom 132a and the vertical wall 132c on the vehicle rear side of the bead will be described. FIG. 12 is a graph showing the relation between the deformation acceleration and the stroke at pedestrian collision when the inclination angle of the vertical walls is changed. As described above, in this embodiment, inclination angle θ of the vertical wall 132b on the vehicle front side and the vertical wall 132c on the vehicle rear side is preferably in the range of 25° to 45°. As indicated by the alternate long and two short dashes line in FIG. 12, when inclination angle θ of the vertical walls is in the range of 25° to 45°, the bead at the center portion in the vehicle front-rear direction shows the same deformation tendency as in FIG. 11(b). However, when inclination angle θ exceeds 45°, at secondary collision, the vertical walls collide with the incorporated components inside the hood at an entering angle close to a vertical angle with respect to the incorporated components, so that the bead can be restrained from being collapsed or deformed. As shown in FIG. 12, the deformation stroke until the peak value of the second wave of acceleration is made shorter, so that the peak value of the second wave of acceleration is likely to be higher. Therefore, in the present invention, the bead bottom 132a is preferably provided at an angle of 25° to 45° between the bead bottom 132a and the vertical wall 132b on the vehicle front side and between the bead bottom 132a and the vertical wall 132c on the vehicle rear side.

(Fifth Embodiment)

Figure 13A:
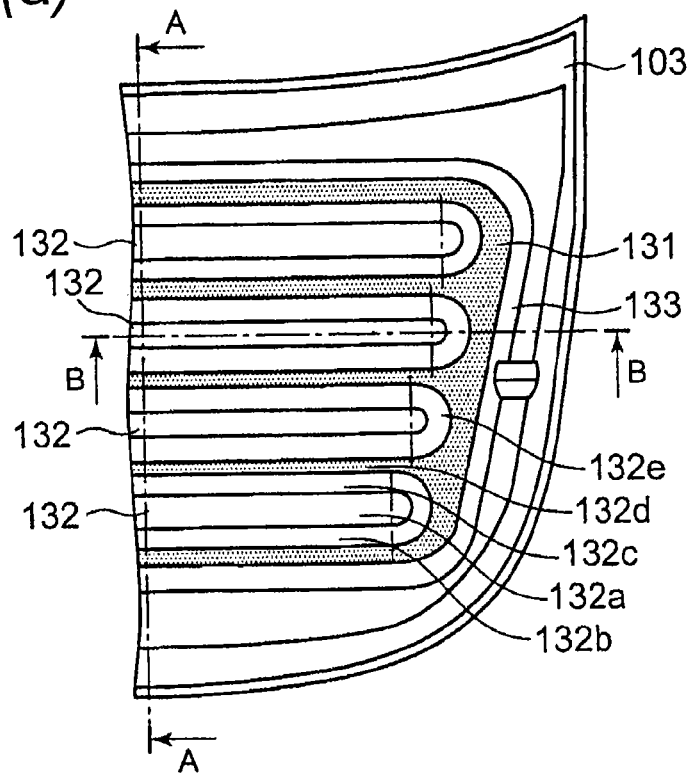
FIG. 13(a) is a plan view showing a vehicle hood panel according to a fifth embodiment of the present invention.
Figure 13B:
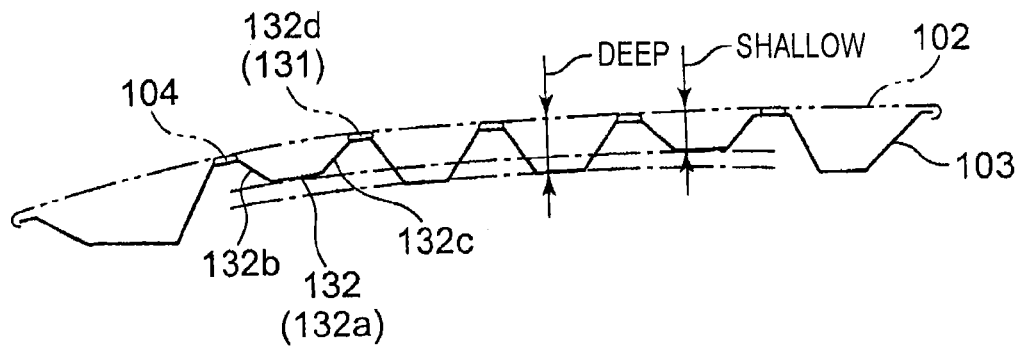
FIG. 13(b) is a cross-sectional view taken along line A-A in FIG. 13(a)
Figure 13C:
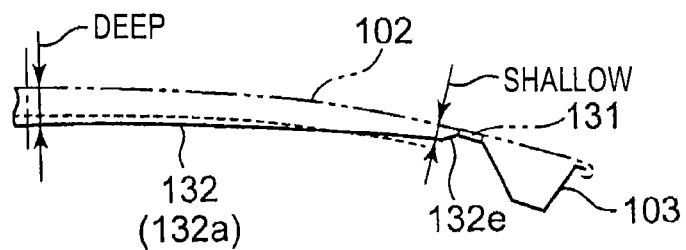
FIG. 13(c) is a cross-sectional view taken along line B-B in FIG. 13(a)

A vehicle hood panel according to a fifth embodiment of the present invention will be described. FIG. 13(a) is a plan view showing the vehicle hood panel according to the fifth embodiment of the present invention. FIG. 13(b) is a cross-sectional view taken along line A-A in FIG. 13(a). FIG. 13(c) is a cross-sectional view taken along line B-B in FIG. 13(a). In this embodiment, the depth from the joining point surface 131 of the bead 132 at the center portion of the hood panel in the vehicle front-rear direction is greater than the depth from the joining point surface 131 of the bead 132 at the end. This embodiment is different from the fourth embodiment in that as shown in FIG. 13(c), the bead 132 is inclined to be gradually deeper from the end toward the center portion in the vehicle right-left direction, and the bottom 132a is shallower at the end in the vehicle right-left direction. Other structure is the same as in the fourth embodiment.

In this embodiment, to cope with pedestrian head collision with the center portion of the hood panel in which the deformation acceleration after the first wave of acceleration is particularly significantly lowered, the center portion has the deepest bead depth so that the bead depth becomes gradually smaller toward the end in the vehicle right-left direction. That is, at pedestrian head collision, the period during which the acceleration after the peak of the first wave of acceleration is continued to be low is the longest when the head of a pedestrian collides with the center of the hood panel. Then, toward the end in the vehicle front-rear direction and in the vehicle right-left direction, the influence of the deformation resistance near the vertical wall 133 in the outer periphery of the joining point surface and the side vertical wall 132e of the bead is received early, so that the timing at which the acceleration becomes higher comes early. In this embodiment, the depth becomes continuously smaller from the center portion toward the end in the vehicle right-left direction, so that the timing at which the inner panel comes into contact with the incorporated components below the inner panel is actively changed. As compared with the fourth embodiment, the pedestrian protection performance can be prevented from being non-uniform in the vehicle right-left direction more effectively.

Figure 19A:
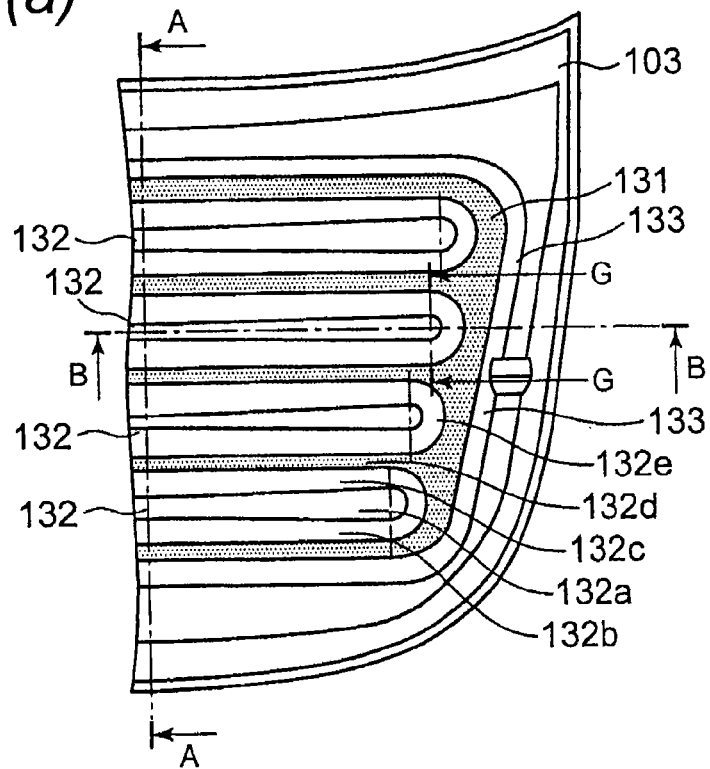
FIGS. 19(a) to 19(c) are diagrams showing another modification of the vehicle hood panel according to the fifth embodiment.
Figure 19B:
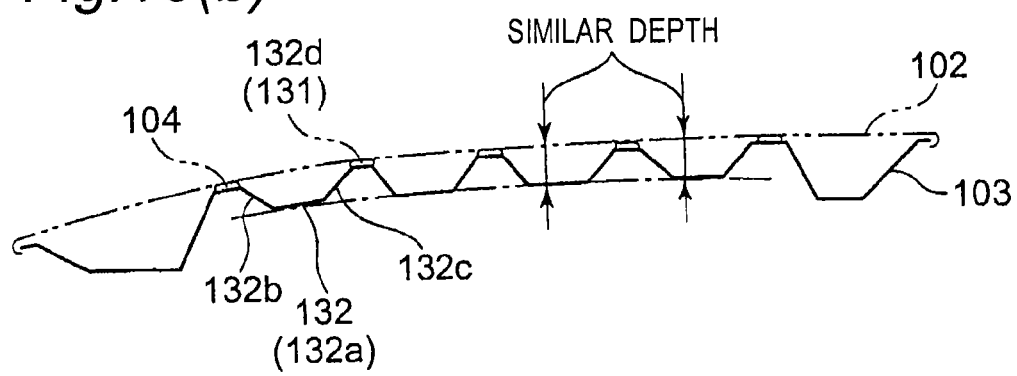
Figure 19C:
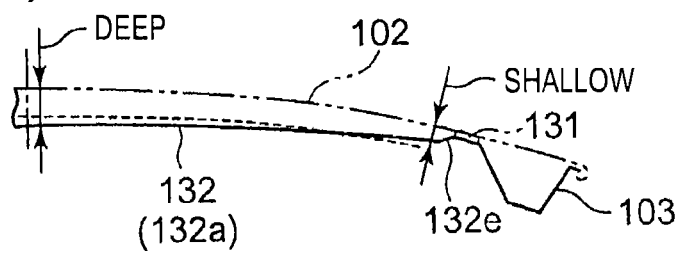

In this embodiment, in all the beads 132, the bead depth becomes gradually greater from the end toward the center portion in the vehicle right-left direction. However, the structure which changes the bead depth in the vehicle right-left direction should be added to at least the bead 132 in which the pedestrian protection performance is significantly non-uniform in the vehicle right-left direction, that is, to the bead 132 at the center portion in the vehicle front-rear direction. The bead 132 at the end in the vehicle front-rear direction is not required to have the structure of this embodiment. In addition, in this embodiment, the bead at the center portion in the vehicle front-rear direction is deeper than the bead at the end in the vehicle front-rear direction. However, as shown in FIG. 19(b), the beads in the vehicle front-rear direction may have the same depth. In this structure, when the head of the pedestrian collides with the vicinity of the center portion in the vehicle right-left direction, since the bead at the center portion is set to be deeper, the pedestrian protection performance can be prevented from being non-uniform in the vehicle right-left direction.

Figure 20A:
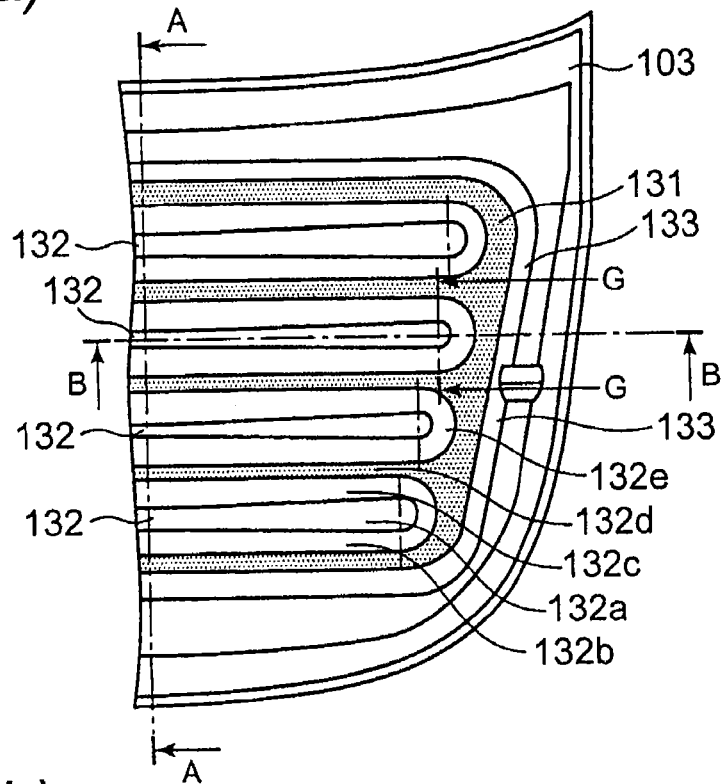
FIGS. 20(a) to 20(c) are diagrams showing a further modification of the vehicle hood panel according to the fifth embodiment.
Figure 20B:
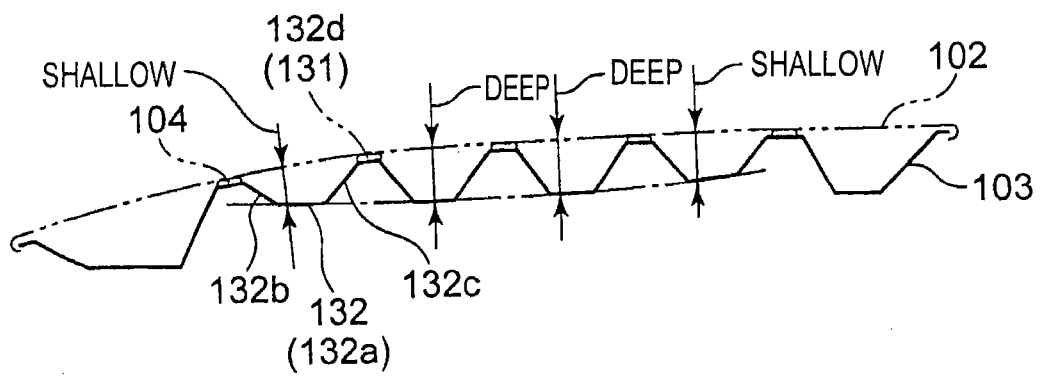
Figure 20C:
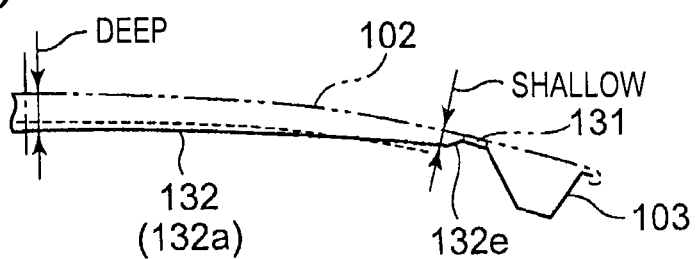

As shown in FIG. 20(a), in this embodiment, an enveloping surface including the bead bottoms 132a may be inclined so that the depth from the joining point surface 131 is increased from the end toward the center portion in the vehicle front-rear direction. By adopting such a structure, the bead depth near the center portion of the hood panel can be set to be greater. That is, as compared with the structure which makes the bead depth constant in the vehicle front-rear direction, by controlling the bead depth more actively, the timing at which the hood panel comes into contact with the incorporated components below the hood can be controlled. The pedestrian protection performance can be more uniform in the vehicle front-rear direction.

Figure 14A:
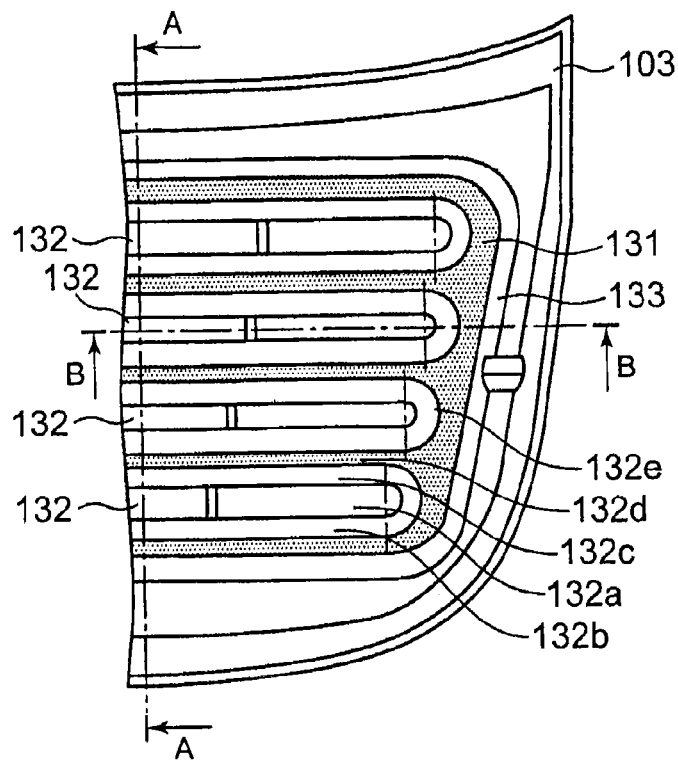
FIGS. 14(a) to 14(c) are diagrams showing a modification of the vehicle hood panel according to the fifth embodiment of the present invention.
Figure 14B:
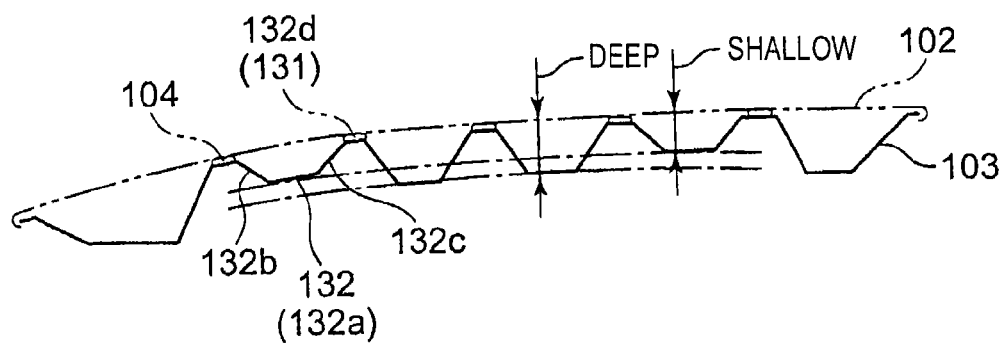
Figure 14C:
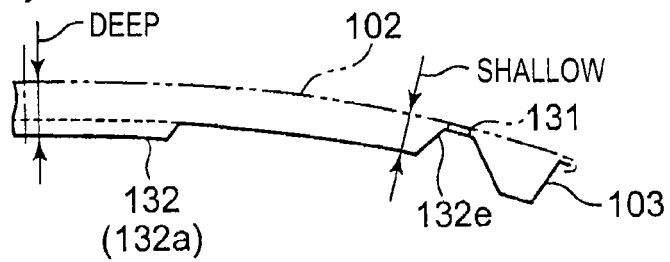

A modification of the vehicle hood panel according to the fifth embodiment will be described. FIGS. 14(a) to 14(c) are diagrams showing the modification of the vehicle hood panel according to the fifth embodiment of the present invention. In the fifth embodiment, the depth of the bead 132 is gradually changed in the vehicle right-left direction. However, in this modification, the bead 132 is provided with a step in the intermediate portion between the center portion and the end in the vehicle right-left direction so that the bead depth is changed in the step. In this modification, when the head of the pedestrian collides with the vicinity of the center of the hood panel, the timing at which the inner panel comes into contact with the incorporated components below the inner panel comes early. On the other hand, when the head of the pedestrian collides with the end in the vehicle right-left direction, the timing at which the inner panel comes into contact with the incorporated components below the inner panel comes late. With this, the pedestrian protection performance can be effectively prevented from being non-uniform in the vehicle right-left direction. In this modification, as compared with the fifth embodiment in which the collision portion is continuously changed in the vehicle right-left direction, the effect of making the pedestrian protection performance uniform is slightly lower. However, by the step in the intermediate portion between the center portion and the end in the vehicle right-left direction, spreading deformation can be restrained, the acceleration after the peak of the first wave of acceleration can be prevented from being suddenly lowered, and the amount of energy absorption in the initial stage of collision can be larger.

In this modification, the structure which changes the bead depth in the vehicle right-left direction should be added to at least the bead 132 in which the pedestrian protection performance is significantly non-uniform in the vehicle right-left direction, that is, to the bead 132 at the center portion in the vehicle front-rear direction. The bead 132 at the end in the vehicle front-rear direction is not required to have such a structure.

(Sixth Embodiment)

Figure 15A:
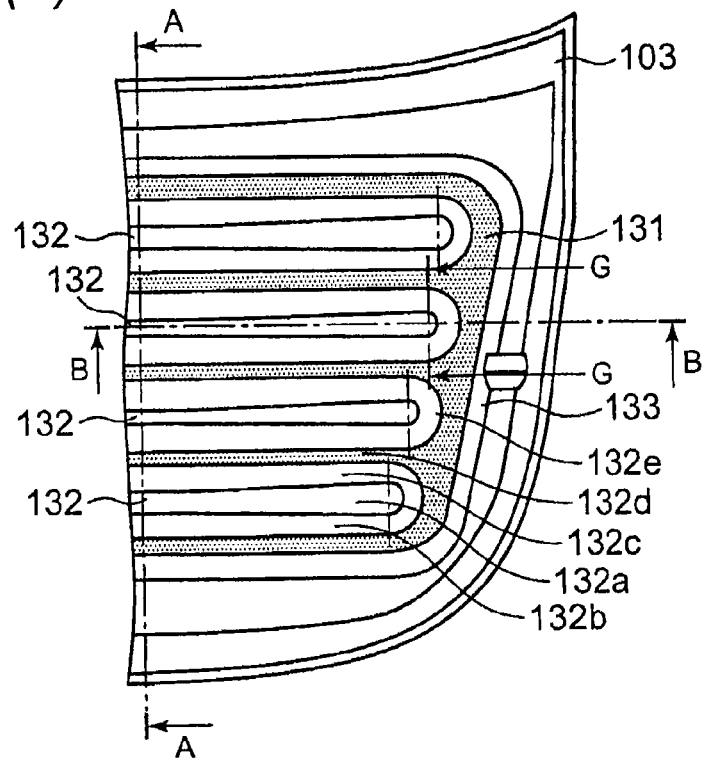
FIG. 15(a) is a plan view showing a vehicle hood panel according to a sixth embodiment of the present invention.
Figure 15B:
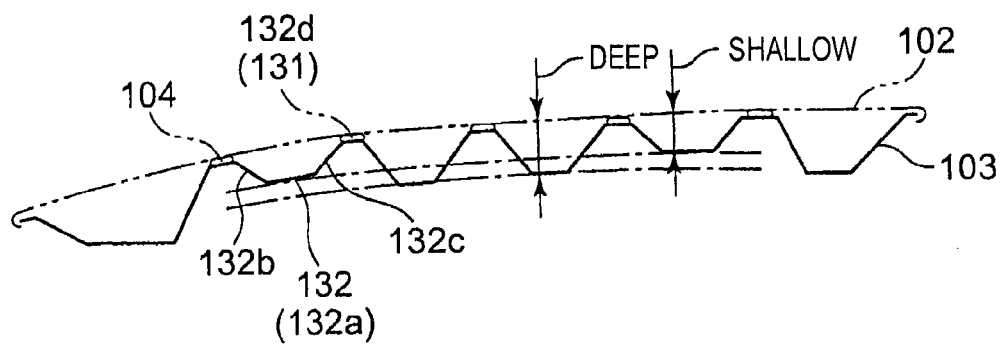
FIG. 15(b) is a cross-sectional view taken along line A-A in FIG. 15(a)
Figure 15C:
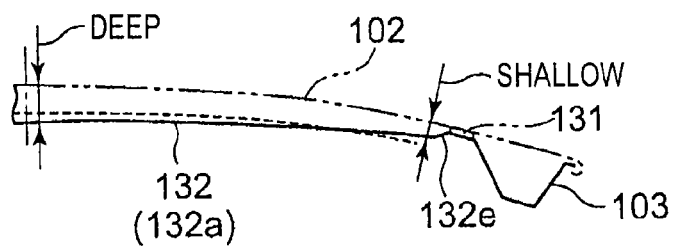
FIG. 15(c) is a cross-sectional view taken along line B-B in FIG. 15(a)
Figure 16A:
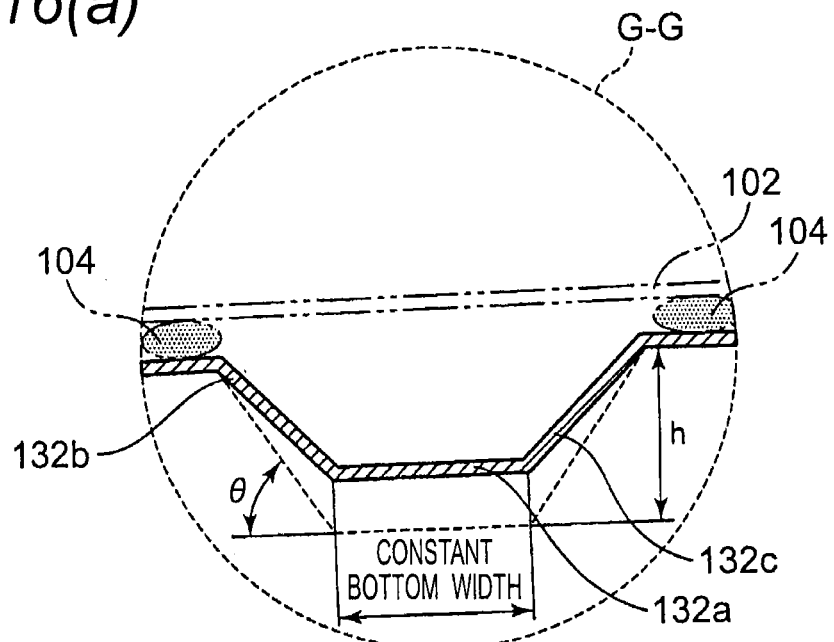
FIG. 16(a) is a cross-sectional view of the vehicle hood panel of the present invention taken along line G-G in FIG. 15(a) in which the width of the bottom of the bead is constant.
Figure 16B:
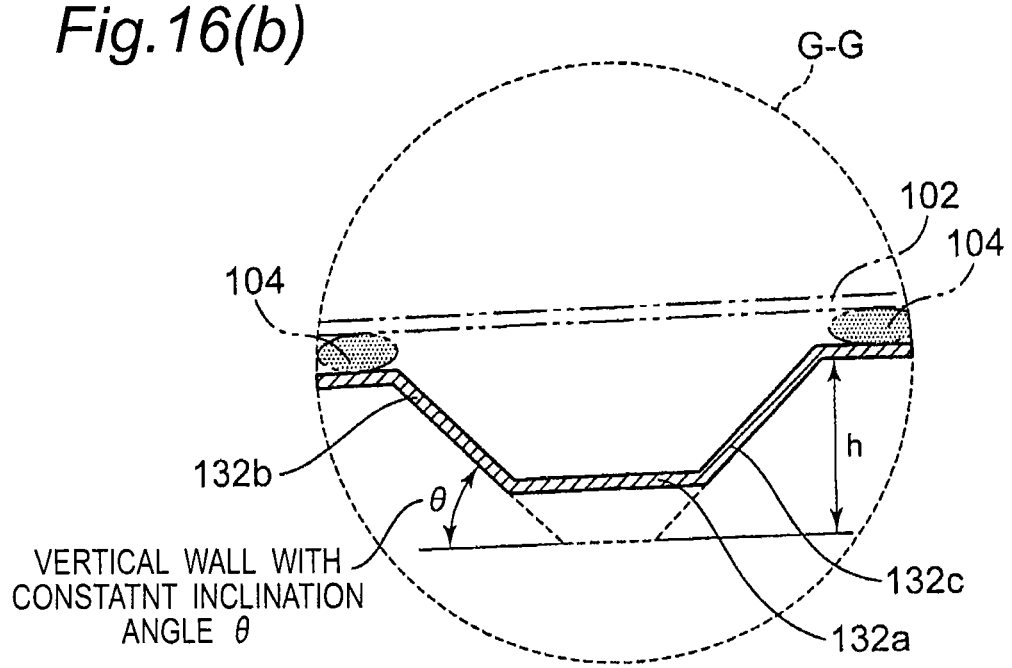
FIG. 16(b) is a cross-sectional view of the vehicle hood panel of the present invention taken along line G-G in FIG. 15(a) in which the inclination angle of the vertical walls is constant.

A vehicle hood panel according to a sixth embodiment of the present invention will be described. FIG. 15(a) is a plan view showing the vehicle hood panel according to the sixth embodiment of the present invention. FIG. 15(b) is a cross-sectional view taken along line A-A in FIG. 15(a). FIG. 15(c) is a cross-sectional view taken along line B-B in FIG. 15(a). FIGS. 16(a) and 16(b) are cross-sectional views of the vehicle hood panel of the present invention taken along line G-G in FIG. 15(a) in which the width of the bead bottom is constant and the inclination angle of the vertical walls is constant. Like the fifth embodiment, when the width of the bottom 132a of the bead is constant in the vehicle right-left direction, when the bead depth is changed in the vehicle right-left direction, as shown in FIG. 16(a), in the vertical wall 132b on the vehicle front side and the vertical wall 132c on the vehicle rear side of the bead 132, inclination angle θ with respect to the bottom 132a is larger at the center portion (the dashed line portion in FIG. 16(a)) than the end in the vehicle right-left direction. At secondary collision, the entering angle of the vertical walls 132b and 132c with respect to the incorporated components inside the hood is different in the vehicle right-left direction. The deformation stroke until the peak value of the second wave of acceleration is shorter at the center portion than at the end in the vehicle right-left direction. The peak value of the second wave of acceleration is likely to be higher.

In this embodiment, as shown in FIGS. 15(a) and 16(b), in the bead 132, the angle between the bottom 132a and the vertical wall 132b on the vehicle front side and angle θ between the bottom 132a and the vertical wall 132c on the vehicle rear side are equal in the vehicle right-left direction. With this, the width of the bottom 132a of the bead becomes gradually narrower from the end toward the center portion in the vehicle right-left direction. Therefore, the deformation stroke at secondary collision and the peak value of the second wave of acceleration can be prevented from being non-uniform in the vehicle right-left direction. In addition, inclination angle θ of the vertical walls 132b and 32c of the bead is not required to have a specific range. The settable range of inclination angle θ of the vertical walls can be usefully utilized to improve the degree of freedom of the design of the vehicle hood panel.

In this embodiment, the structure which changes the bead depth in the vehicle right-left direction should be added to at least the bead 132 in which the pedestrian protection performance is significantly non-uniform in the vehicle right-left direction, that is, to the bead 132 at the center portion in the vehicle front-rear direction. The bead 132 at the end in the vehicle front-rear direction is not required to have the structure of this embodiment.

Figure 17A:
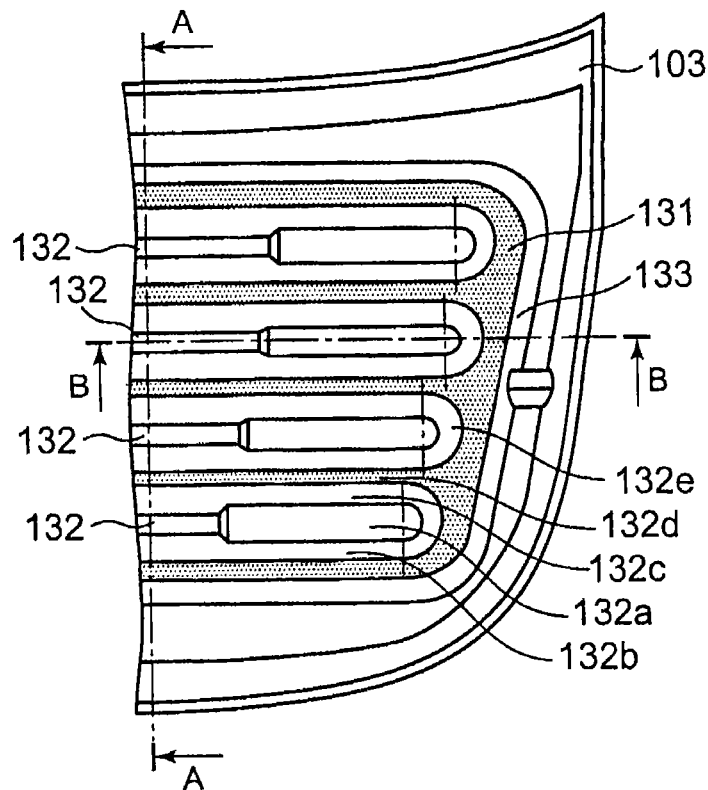
FIGS. 17(a) to 17(c) are diagrams showing a modification of the vehicle hood panel according to the sixth embodiment of the present invention.
Figure 17B:
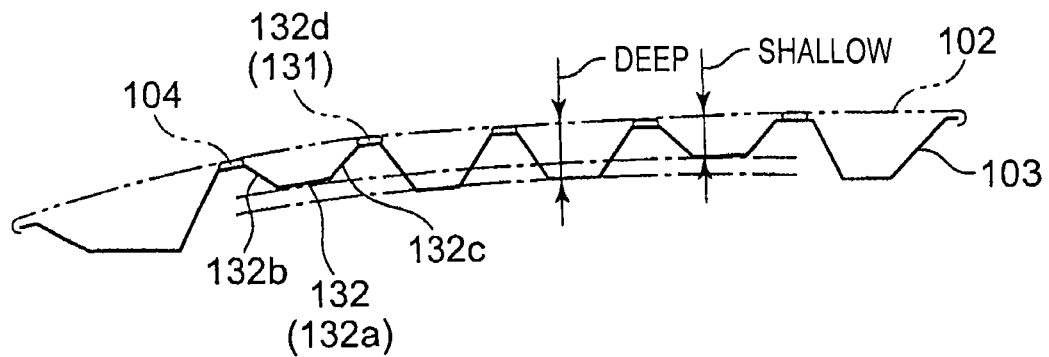
Figure 17C:
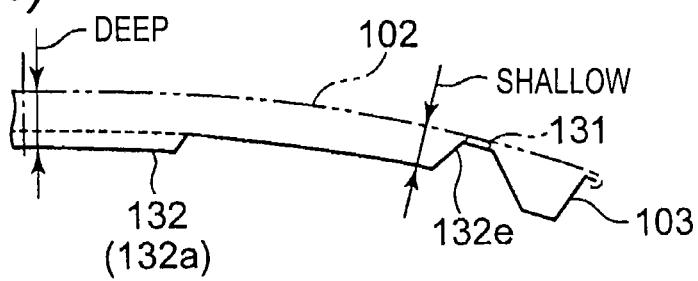

Like the fifth embodiment, in this embodiment, the depth of the bead 132 is gradually changed in the vehicle right-left direction. However, as shown in FIG. 17(c), the step may be provided in the intermediate portion between the center portion and the end of the bead 132 in the vehicle right-left direction, and the bead depth may be changed in the step. In this modification, as compared with the sixth embodiment in which the collision portion is continuously changed, the effect of preventing the pedestrian protection performance from being non-uniform is slightly lower. However, the stress can be easily propagated in the vehicle front-rear direction through the step in the intermediate portion of the bead 132 between the center portion and the end in the vehicle right-left direction. At secondary collision, in the bead 132, the center portion in the vehicle right-left direction is collided with the incorporated components inside the hood, and then, the end in the vehicle right-left direction is collided with the incorporated components inside the hood.

(Seventh Embodiment)

Figure 18:
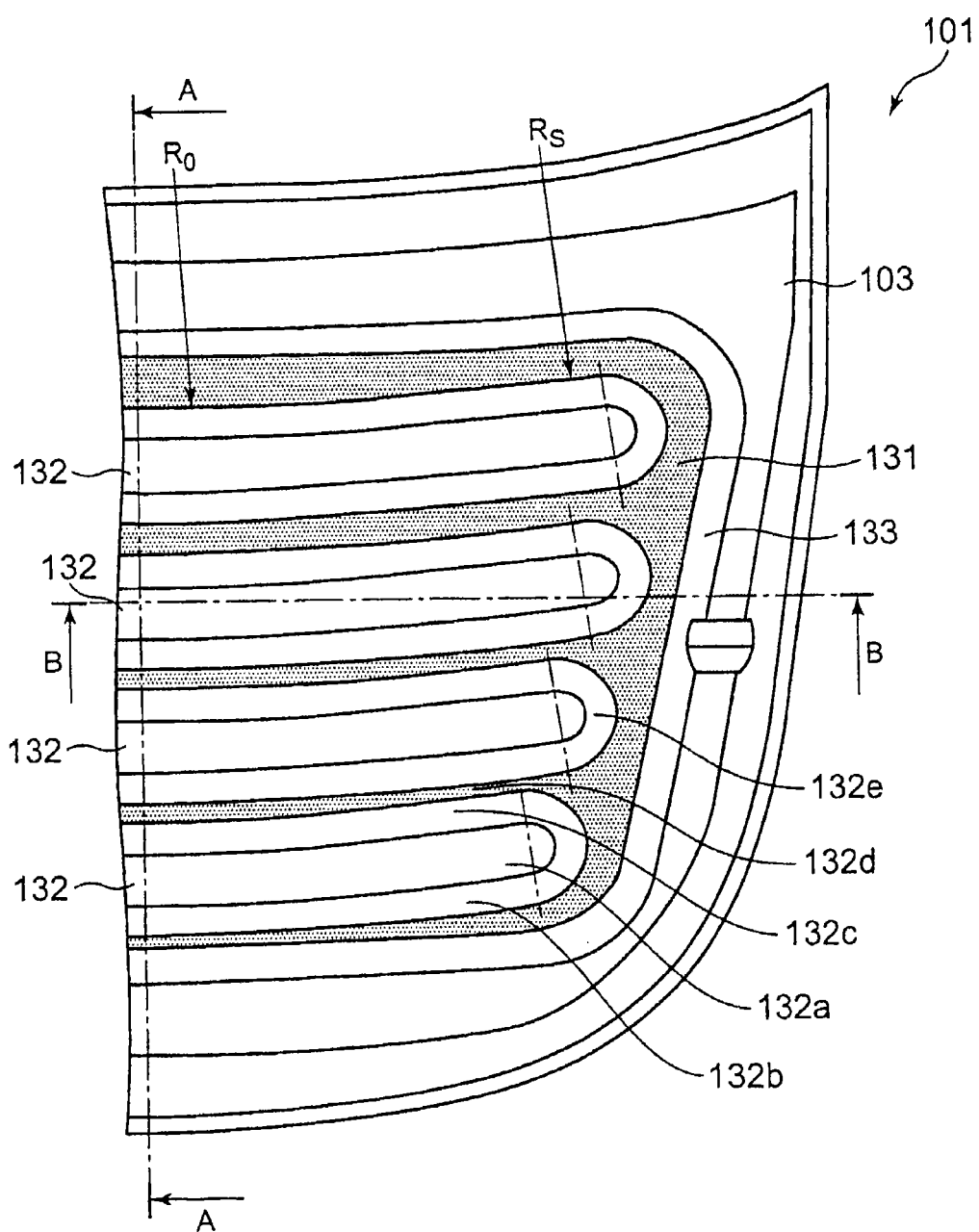
FIG. 18 is a plan view showing a vehicle hood panel according to a seventh embodiment of the present invention.

A vehicle hood panel according to a seventh embodiment of the present invention will be described. FIG. 18 is a plan view showing the vehicle hood panel according to the seventh embodiment of the present invention. In the vehicle hood panel 101 of this embodiment, according to the vehicle hood panel of the fourth embodiment, as shown in FIG. 18, the upper and lower edges of the vertical walls 132b and 132c of the bead 132 in the inner panel 103 are curved to be convex to the vehicle front side in plan view. Other structure is the same as in the fourth embodiment.

In this embodiment, the curved portions of the vertical walls 132b and 132c have components extended in the vehicle front-rear direction to act as reinforcing ribs. At primary collision, the bead 132 is even less likely to be spread-deformed. The collision energy can be effectively propagated in the vehicle front-rear direction through the curved portions of the vertical walls. The stress is distributed in the vehicle right-left direction, so that the pedestrian protection performance of the hood panel can be prevented from being non-uniform in the vehicle right-left direction more effectively than in the fourth embodiment.

For instance, preferably, at the curved upper edges of the bead 132, in plan view, the radius of curvature $R_0$ at the center in the vehicle right-left direction is smaller than the radius of curvature $R_s$ at the end in the vehicle right-left direction. With this, the above effect can be further expected.

In this embodiment, at least the upper edges of the vertical walls 132b and 132c of the bead 132 should be curved. The lower edges of the vertical walls 132b and 132c may be flat. In this embodiment, the vertical walls are curved to be convex to the vehicle front side. However, the vertical walls may be convex to the vehicle rear side. Further, only one of the vertical wall 132b on the vehicle front side and the vertical wall 132c on the vehicle rear side may be curved.

In this embodiment, according to the hood panel of the fourth embodiment, the vertical walls of the bead 132 are curved. However, also when the vertical walls of the bead are curved according to the hood panels of the fifth and sixth embodiments, the pedestrian protection performance can be prevented from being non-uniform in the vehicle right-left direction more effectively.

(Eighth Embodiment)

FIG. 21(b) is a bottom view of a vehicle hood panel according to an eighth embodiment of the present invention. FIG. 21(a) is a schematic diagram of the cross-sectional structure at the center in the vehicle width direction. The vehicle hood panel of this embodiment has an outer panel 201, and an inner panel 202 below the outer panel, that is, on the inner side of the hood. The inner panel 202 is fixed to the outer panel 201 in such a manner that the edges of the outer panel 201 are folded back and the edges of the inner panel 202 are fitted and joined to folded-back portions 201a and 201b.

In the inner panel 202, a plurality of beads 203 extended in the vehicle width direction are formed. Each bead 203 has a band-shaped bottom 203a extended in the vehicle width direction, and sides 203b raised from the edges of the bottom 203a. The portion between the upper edges of the sides 203b of the adjacent beads 203 extended in parallel is a joining point surface 204. The joining point surface 204 is joined to the lower surface of the outer panel 201 by mastic.

As described above, the joining point surface 204 connects the upper edges of the beads 203. As shown in FIG. 21(b), for instance, in the region of the substantially rear half of the inner panel 202 in the vehicle front-rear direction, formed are two beads 203 extended in the vehicle width direction and the joining point surface 204 surrounding the beads 203. In the region of the substantially front half of the inner panel 202 in the vehicle front-rear direction, formed are three beads 203 extended in the vehicle width direction and the joining point surface 204 surrounding the beads 203.

A striker 206 which fixes the panel to the vehicle body is fixed to and supported by a lock reinforcing member 205. The lock reinforcing member 205 is extended between the lower surface of the bead at the vehicle front end of the inner panel and the outer surface of the side on the vehicle rear side of the second bead from the bead at the vehicle front end, and is fixed therebetween by joining. In FIG. 21(a), the lock reinforcing member 205 has a substantially hat shape in vehicle side view, but may have a substantially truncated pyramid shape in which the striker joining portion is provided in the lowest portion. The shape of the lock reinforcing member 205 is appropriately selected according limitations due to the components below the hood and specifications required as a component.

At the same time, the bead 203 near the vehicle front end (the frontmost bead) is surrounded by the joining point surface 204. A portion 204a of the joining point surface 204 on the vehicle front side of the frontmost bead 203 passes by the lateral side of the frontmost bead 203, and stretches to a portion 204c of the joining point surface 204 closer to the vehicle rear side than the lock reinforcing member 205. That is, in plan view, a portion 204b of the joining point surface 204 passing by the lateral side of the frontmost bead 203 passes by the lateral side in the vehicle width direction of the lock reinforcing member 205, from the portion 204a on the vehicle front side of the frontmost bead 203, and stretches to the portion 204c closer to the vehicle rear side than the lock reinforcing member.

On the bottom surface of the inner panel 202 at the center portion in the vehicle front-rear direction and at the end in the vehicle width direction, an upwardly convex bead 207 is provided. The convex bead 207 is a so-called crush bead, which is provided as a start point from which the hood panel is bending-deformed in doglegged shape in side view at front collision of vehicles.

The operation of the vehicle hood panel of this embodiment will be described. In this embodiment, the joining point surface 204 joined to the outer panel 201 includes the portion 204b on the lateral side of the lock reinforcing member 205 supporting the striker 206 that connects and fixes the panel to the vehicle body. Therefore, without providing the dent reinforcing member, the mastic joining portion of the inner panel 202 to the outer panel 201 can be provided to extend to the vicinity of the striker 206 at the vehicle front end, so that the dent resistance can be sufficiently obtained. That is, the dent resistance can be improved without increasing the number of components.

The mastic joining portion of the inner panel 202 above the striker 206 to the outer panel 201 (the joining point surface 204 of the inner panel 202) is extended to the joining portion (the portion 204c of the joining point surface 204) to the inner panel 202 on the vehicle rear side of the lock reinforcing member 205 via the outer side in the vehicle width direction of the striker 206. Therefore, the vertical walls (the sides 203b of the bead 203) extended in the vehicle front-rear direction can be disposed on the outer side in the vehicle width direction of the striker 206. That is, the sides 203b of the bead 203 as the vertical walls surround the striker 206. The dent resistance and rigidity immediately above the striker 206 can be easily ensured.

In this embodiment, when the head of a pedestrian collides with the vicinity of the lock reinforcing member 205, the stress is easily propagated in the vehicle front-rear direction through the mastic joining portion (the joining portion of the joining point surface 204 to the outer panel 201). Therefore, the deformation area in the initial stage of collision can be increased, so that the primary peak of acceleration can be improved according to increase of the inertia mass. With this, the amount of energy absorption in the first half of collision can be increased. The HIC value can be reduced to improve the pedestrian protection performance.

(Ninth Embodiment)

A ninth embodiment of the present invention will be described with reference to FIGS. 22(a) and 22(b). In this embodiment, in the substantially vehicle front half of the inner panel 202, provided are beads 208 extended in the vehicle front-rear direction and a joining point surface 209 communicating the upper edges of the sides of the beads 208, which is different from the embodiment shown in FIGS. 21(a) and 21(b).

In this embodiment, the lock reinforcing member 205 supporting the striker 206 is joined to the lower surface of the inner panel 202 at the vehicle front end and the lower surface of the bead 208 at the vehicle front end. With this, the lock reinforcing member 205 is provided on the lower surface of the inner panel 202 across a portion 209a of the joining point surface 209 at the vehicle front end.

In this embodiment, in plan view, the joining point surface 209 near the lock reinforcing member 205 passes from the portion 209a at the vehicle front end via a portion 209b on the lateral side of the lock reinforcing member 205 to a portion 209c closer to the vehicle rear side than the lock reinforcing member 205.

With this, in this embodiment, the joining point surface 209 passes near the lock reinforcing member 205. Without providing the dent reinforcing member, the mastic joining portion of the inner panel 202 to the outer panel 201 can be provided to extend to the vicinity of the striker 206 at the vehicle front end. The dent resistance can thus be sufficiently obtained. In addition, a side 208b of the bead 208 is provided as a vertical wall near the striker 206. The dent resistance and rigidity immediately above the striker can thus be increased. Further, in this embodiment, when the head of a pedestrian collides with the vicinity of the lock reinforcing member 205, the stress is easily propagated in the vehicle front-rear direction through the mastic joining portion (the joining portion of the joining point surface 209 to the outer panel 201). Therefore, the primary peak of acceleration can be improved, the amount of energy absorption in the first half of collision can be increased, and the HIC value can be reduced to improve the pedestrian protection performance.

Most desirably, the lock reinforcing member 205 is joined, in the portion on the vehicle rear side, to the lower surface of the portion on the vehicle front side at the bottom of the bead 208 provided at the center portion of the inner panel 202, and is joined, in the portion on the vehicle front side, to the lower surface of the inner panel 202 on the vehicle front side, so that between the joining portions, provided are the striker 206 and the joining point surface 209a (the joining portion to the outer panel 201 at the front end of the inner panel 202). With this, when the head of the pedestrian collides with the hood panel, a bottom 208a of the bead 208 on the frontmost side is supported by the lock reinforcing member 205. The acceleration can be prevented from being excessively lowered after collision. While the HIC value is ensured, the collision stroke can be shorter.

(Tenth Embodiment)

A tenth embodiment of the present invention will be described with reference to FIGS. 23(a) and 23(b). In this embodiment, in the inner panel 202, a plurality of beads 208 extended in the vehicle front-rear direction are in substantially parallel with each other. The joining point surface 209 joined to the outer panel 201 connects the upper edges of the sides 208b of the beads 208. The joining point surface 209 stretches from the portion 209a at the vehicle front end to the portion 209b passing by the lateral side of the lock reinforcing member 205, and stretches to the portion 209c on the vehicle rear side from the portion 209b. Further, in this embodiment, the joining point surface 209 is disposed in annular shape along the edge of the inner panel 202 to surround all the beads 208. In this embodiment, at the center portion in the vehicle front-rear direction, a plurality of crush beads 207 are disposed at the end in the vehicle width direction and in the bottom surfaces of the beads 208 extended in the vehicle front-rear direction. With this, the food panel is easily bending-deformed at front collision of vehicles, so that the front collision performance can be ensured.

In this embodiment, in addition to the same effect as in the eighth and ninth embodiments, the joining point surface 209 is continuously formed to pass from the position (the portion 209a) above the striker 206 via the portion 209b on the outer side in the vehicle width direction of the striker 206, thereby surrounding the center portion of the inner panel 202 in substantially annular shape. At hitting each portion of the vehicle, the stress can be widely propagated in the vehicle front-rear direction or in the vehicle width direction through the mastic joining portion (the joining point surface 209) to the outer panel 201 in substantially annular shape. The primary peak of acceleration is thus easily ensured.

(Eleventh Embodiment)

Figures 24A, 24B:
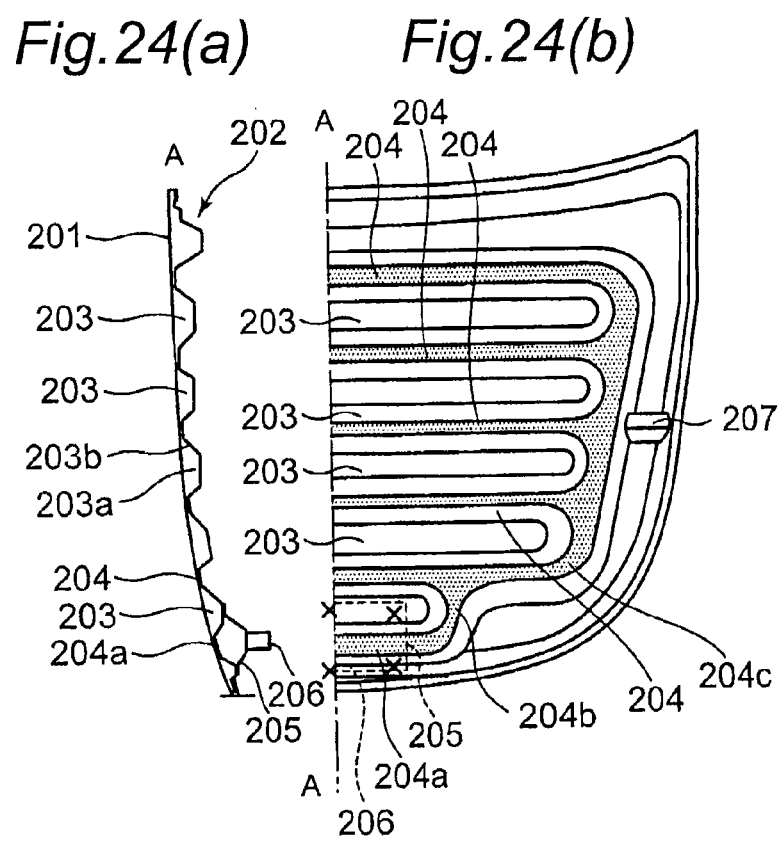
FIG. 24(a) is a schematic diagram showing the cross-sectional structure of a vehicle hood panel according to an eleventh embodiment of the present invention.
FIG. 24(b) is a bottom view thereof (only the half in the vehicle width direction is shown)

FIG. 24(b) is a bottom view of the inner panel 202 showing an eleventh embodiment of the present invention. Like FIG. 21(b), in this embodiment, a plurality of beads 203 are extended in the vehicle width direction. The joining point surface 204 connects the upper edges of the sides 203b of the beads 203. Unlike FIG. 21(b), the joining point surface 204 is disposed in annular shape along the edge of the inner panel 202 to surround all the beads 203. In this embodiment, the lock reinforcing member 205 is joined and fixed to the lower surface of the inner panel 202 at the vehicle front end and to the lower surface at the bottom of the bead 203 that is located across the portion 204a on the vehicle front side of the joining point surface 204 from the vehicle front end and is located on the rear side of the portion 204a.

Figures 23A, 23B:
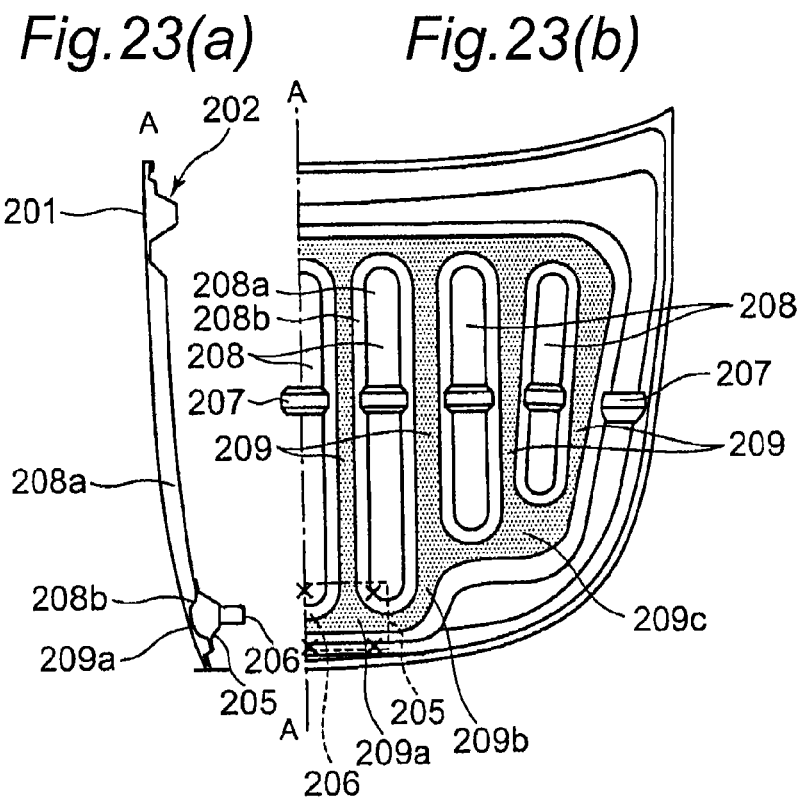
FIG. 23(a) is a schematic diagram showing the cross-sectional structure of a vehicle hood panel according to a tenth embodiment of the present invention.
FIG. 23(b) is a bottom view thereof (only the half in the vehicle width direction is shown)

This embodiment has the same effect as in FIG. 21(b), and like FIG. 23(b), the stress can be widely propagated in the vehicle front-rear direction or in the vehicle width direction, so that the primary peak of acceleration is easily ensured. In addition, in this embodiment, the lock reinforcing member 205 is joined and fixed to the lower surface of the inner panel 202 at the front end, and is joined and fixed to the lower surface at the bottom of the bead 203 at the vehicle front end. Between these joining portions, the striker 206 and the front portion 204a of the joining point surface 204 are disposed. When the head of a pedestrian collides with the hood panel, the bottom 203a of the bead 203 on the frontmost side is supported by the lock reinforcing member 205. The acceleration can be prevented from being excessively lowered after collision. While the HIC value is held, the collision stroke can be shorter.

(Twelfth Embodiment)

FIG. 25(b) is a bottom view of the inner panel 202 showing a twelfth embodiment of the present invention. In this embodiment, beads 210 are basically extended in the vehicle width direction. However, the beads 210 are slightly curved to the vehicle rear side from the center toward the end in the vehicle width direction. In addition, a joining point surface 211 which connects the upper edges of the sides of the beads 210 is also basically extended in the vehicle width direction, but is slightly curved. Further, the joining point surface 211 is extended in annular shape along the edge of the inner panel 202 to surround all the beads 210. Furthermore, in a bead 212 at the vehicle front end, the center portion at the bottom in the width direction is extended to the vehicle front side. The bead 212 is thus wide.

In this embodiment, the joining point surface 211 is extended from a portion 211a above the lock reinforcing member 205 via a portion 211b on the lateral side of the lock reinforcing member 205 to a portion 211c on the vehicle rear side of the lock reinforcing member 205. The joining point surface 211, that is, the joining portion of the outer panel 201 to the inner panel 202, is located near the lock reinforcing member 205.

(Thirteenth Embodiment)

FIG. 26(b) is a bottom view of the inner panel 202 showing a thirteenth embodiment of the present invention. In this embodiment, the present invention is applied to a small hood whose length in the vehicle front-rear direction is relatively short. In this embodiment, the lock reinforcing member 205 is joined and fixed to be extended between the front end of the inner panel 202 and the lower surface at the bottom of a bead 213 at the rear thereof, and the joining point surface 214 is extended from a portion above the lock reinforcing member 205 via a portion on the lateral side of the lock reinforcing member 205 to a portion on the vehicle rear side of the lock reinforcing member 205.

(Fourteenth Embodiment)

Figure 27A:
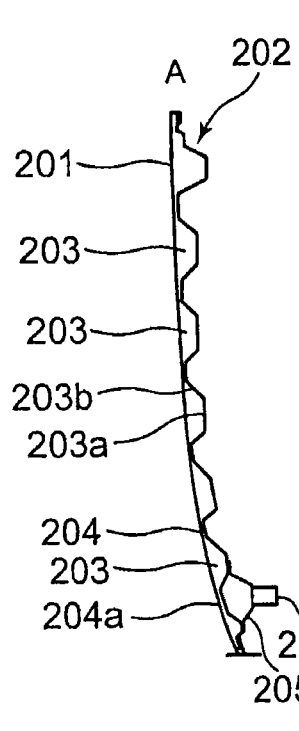
FIG. 27(a) is a schematic diagram showing the cross-sectional structure of a vehicle hood panel according to a fourteenth embodiment of the present invention.
Figure 27B:
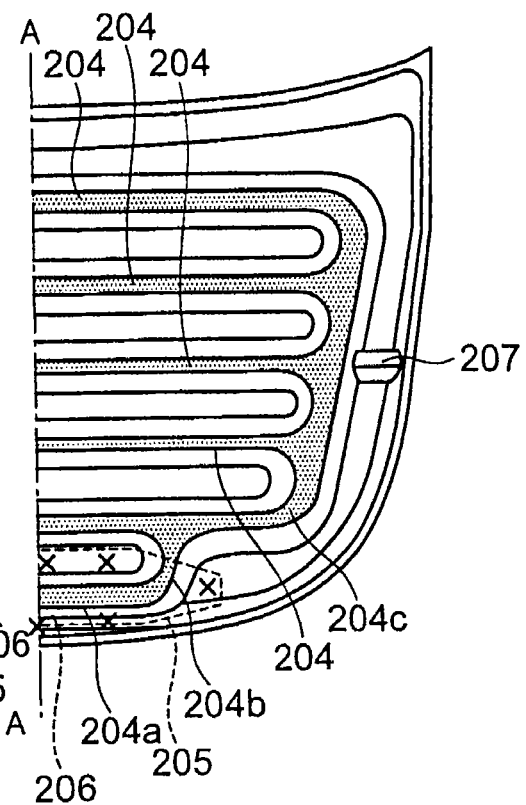
FIG. 27(b) is a bottom view thereof (only the half in the vehicle width direction is shown)

FIG. 27(b) is a bottom view of the inner panel 202 showing a fourteenth embodiment of the present invention. Like FIG. 24(a), in this embodiment, the lock reinforcing member 205 is joined to the lower surface at the front end of the inner panel 202, and is joined to the lower surface at the bottom of the bead 203 on the vehicle front side across the portion 204a of the joining point surface 204 on the vehicle front side. Further, in this embodiment, the lock reinforcing member 205 passes over the portion 204b of the joining point surface 204 passing by the lateral side of the striker 206, and is joined and fixed to the lower surface of the peripheral portion of the inner panel 202. In this embodiment, as shown in the plan view in FIG. 27(b), the portion 204b of the joining point surface 204 passes by the lateral side in the vehicle width direction of the striker 206 to stretch to the portion 204c closer to the vehicle rear side than the lock reinforcing member 205.

The joining portion of the lock reinforcing member 205 to the lower surface of the inner panel 202 at the vehicle front end is extended to the position toward the end in the vehicle width direction to a maximum extent. In plan view, between the joining portion on the outermost side and the striker 206, the portion 204b of the joining point surface 204 is provided, so that the lock reinforcing member 205 joins to the lower surface of the hood in the vicinity of the striker 206 in the vehicle width direction. With this, the vicinity of the striker can have a substantially closed cross section by the lock reinforcing member 205 and the inner panel 202. In addition, the thick lock reinforcing member 205 is disposed on the vehicle lower side, so that the rigidity of the hood can be improved.

Needless to say, the present invention is not limited to the above embodiments. For instance, the cross-sectional shape and the extending direction of each bead are selected according to the shape of the hood, as needed. However, most desirably, the bead is extended in the vehicle width direction. With this, at collision of the front ends of vehicles, the hood panel is easily deformed in doglegged shape in side view, so that the hood panel itself is easily restrained from being deformed to the vehicle rear side. The front end collision performance can thus be excellent.

However, the beads extended in the vehicle width direction are not always required to be extended in parallel to the vicinity of the end in the vehicle width direction. With this, depending on the design of the hood, the acceleration after the primary peak at head collision can be too low. In such a case, each bead may be curved or wavy in plan view for adjustment to obtain predetermined acceleration. In addition, according to the limitations of the shape of the hood in plan view, the width of the bead in the vehicle front-rear direction can be conveniently set according to the shape of the hood by being changed in the vehicle width direction.

The present invention is preferable for, in particular, an aluminum hood structure. The aluminum hood structure has lower rigidity and fatigue limit than a steel plate, which increases the plate thickness. However, the deformation strength of the aluminum panel is equal to or more than the deformation strength of a soft steel plate. Consequently, the deformation strength is excessively high by increase of the plate thickness. The aluminum panel is difficult be deformed at pedestrian head collision, which is disadvantageous in pedestrian protection. However, in the structure of the present invention, the lock reinforcing member which is thick and difficult to be deformed is disposed on the lower surface of the inner panel, and the relatively thin inner panel is disposed in the region adhering to the outer panel above the striker which is deformed at pedestrian head collision. The aluminum panel is easily deformed at head collision, and is excellent in the pedestrian protection performance.

The invention claimed is:

1. A vehicle hood panel comprising an outer panel and an inner panel joined to each other,
   wherein the inner panel has a joining point surface provided at a center thereof and joined to the outer panel by mastic, and a plurality of beads of concave cross section extended downwardly from edges of the joining point surface and extended in parallel in a vehicle right-left direction to be surrounded by the joining point surface,
   wherein each bead has a bottom, a front vertical wall communicating the bottom with the edge of the joining point surface on a vehicle front side, a rear vertical wall communicating the bottom with the edge of the joining point surface on a vehicle rear side, and a side vertical wall communicating the bottom with each edge of the joining point surface in a vehicle right-left direction, and
   wherein in at least one of the front vertical wall and the rear vertical wall, an upper edge thereof is curved so that in plan view, a radius of curvature at a center portion in the vehicle right-left direction is smaller than a radius of curvature at each end in the vehicle right-left direction.

2. The vehicle hood panel according to claim 1, wherein the vertical wall with the curved upper edge is curved so that a center portion in the vehicle right-left direction is convex to the vehicle front side in plan view, and has, between the center portion and an end in the vehicle right-left direction, a first intermediate portion in which in plan view, an upper edge thereof is curved to be convex to the vehicle rear side and a radius of curvature thereat is larger than a radius of curvature at the center portion and is smaller than a radius of curvature at the end in the vehicle right-left direction.

3. The vehicle hood panel according to claim 2, wherein the vertical wall with the upper edge has, between the first intermediate portion and the end in the vehicle right-left direction, a second intermediate portion in which in plan view, an upper edge thereof is curved to be convex to the vehicle front side and a radius of curvature thereat is larger than a radius of curvature at the first intermediate portion and is smaller than a radius of curvature at the end in the vehicle right-left direction.

4. The vehicle hood panel according to claim 1, wherein the vertical wall with the curved upper edge also has an edge on the bottom side which is curved so that in plan view, a radius of curvature at the center portion in the vehicle right-left direction is smaller than a radius of curvature at the end in the vehicle right-left direction.

5. The vehicle hood panel according to claim 1, wherein the vertical wall with the curved upper edge has an edge of the bottom side.

6. The vehicle hood panel according to claim 1, wherein in the vertical wall with the curved upper edge, the upper edge is curved in the position of 200 mm or more in the vehicle right-left direction from a side edge of the joining point surface in the vehicle right-left direction.

7. The vehicle hood panel according to claim 1, wherein the bottom of at least one of the beads is provided at a depth of 17.5 mm to 22.5 mm from the joining point surface, and is provided at an angle of 25° to 45° between the bottom and the front vertical wall and between the bottom and the rear vertical wall.

8. A vehicle hood panel comprising an outer panel and an inner panel joined to each other,
   wherein the inner panel has a joining point surface provided at a center thereof and joined to the outer panel by mastic, and a plurality of beads of concave cross section extended downwardly from edges of the joining point surface and extended in parallel in a vehicle right-left direction to be surrounded by the joining point surface,
   wherein each bead has a bottom, and a vertical wall communicating the bottom with the edge of the joining point surface,
   wherein a depth of the bottom from the joining point surface of at least one of the beads at a center portion in a vehicle front-rear direction is greater than a depth of the bottom from the joining point surface of the bead at each end in the vehicle front-rear direction.

9. The vehicle hood panel according to claim 8, wherein in the bead at the center portion in the vehicle front-rear direction, the depth of the bottom from the joining point surface is greater at a center portion than at each end in the vehicle right-left direction.

10. The vehicle hood panel according to claim 9, wherein the bottom of the bead at the center portion in the vehicle front-rear direction is shallower at the end than at the center portion in the vehicle right-left direction.

11. The vehicle hood panel according to claim 8, wherein an enveloping surface including the bottoms of the beads is inclined so that a depth from the joining point surface is increased from the end toward the center portion in the vehicle front-rear direction.

12. The vehicle hood panel according to claim 8, wherein in the bead at the center portion in the vehicle front-rear direction, an angle between the bottom and the vertical wall on the vehicle front side and an angle between the bottom and the vertical wall on the vehicle rear side are uniform in the vehicle right-left direction.

13. The vehicle hood panel according to claim 8, wherein the bottom of the bead is provided at a depth of 17.5 mm to 22.5 mm from the joining point surface, and is provided at an angle of 25° to 45° between the bottom and the vertical wall on the vehicle front side and between the bottom and the vertical wall on the vehicle rear side.

14. A vehicle hood panel comprising:
an outer panel;
an inner panel arranged below the outer panel; and
a lock reinforcing member joined to a lower surface of the inner panel and supporting a striker on the lower surface side of the inner panel,
wherein the inner panel has a plurality of beads each having a bottom and a side, and a joining point surface surrounding an upper edge of a side of each bead,
wherein the joining point surface joins the inner panel to the outer panel, and
wherein in plan view, the joining point surface has a portion passing by a lateral side of the lock reinforcing member or the striker in a vehicle width direction to stretch to a portion closer to a vehicle rear side than the lock reinforcing member.

15. The vehicle hood panel according to claim 14, wherein the joining point surface has an annular portion along an edge of the inner panel, and
wherein the portion passing by the lateral side of the lock reinforcing member stretches to the annular portion.

16. The vehicle hood panel according to claim 15, wherein at least one of the beads is disposed in the region surrounded by the annular portion of the joining point surface.

17. The vehicle hood panel according to claim 14, wherein the joining portion of the lock reinforcing member to the inner panel on the vehicle rear side is joined to an end at a bottom of the bead in the vehicle front direction.

18. The vehicle hood panel according to claim 14, wherein the joining portion of the lock reinforcing member to the inner panel on the vehicle front side is joined to a lower surface of the inner panel across the joining point surface.

* * * * *